(12) United States Patent
Sugaya et al.

(10) Patent No.: US 12,369,064 B2
(45) Date of Patent: *Jul. 22, 2025

(54) ACQUIRING INTERFERENCE INFORMATION USING OBSS AND WITHOUT MANAGEMENT DEVICE

(71) Applicant: Sony Group Corporation, Tokyo (JP)

(72) Inventors: Shigeru Sugaya, Kanagawa (JP); Yuichi Morioka, Kanagawa (JP); Tomoya Yamaura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/599,268

(22) Filed: Mar. 8, 2024

(65) Prior Publication Data

US 2024/0251277 A1 Jul. 25, 2024

Related U.S. Application Data

(63) Continuation of application No. 17/870,859, filed on Jul. 22, 2022, now Pat. No. 11,943,650, which is a continuation of application No. 16/334,380, filed as application No. PCT/JP2017/027072 on Jul. 26, 2017, now Pat. No. 11,438,778.

(30) Foreign Application Priority Data

Sep. 26, 2016 (JP) ................................ 2016-186401

(51) Int. Cl.
*H04W 24/10* (2009.01)
*H04B 17/318* (2015.01)

(52) U.S. Cl.
CPC .......... *H04W 24/10* (2013.01); *H04B 17/318* (2015.01)

(58) Field of Classification Search
CPC ............................ H04W 24/10; H04B 17/318
See application file for complete search history.

(56) References Cited

U.S. PATENT DOCUMENTS

| 9,622,189 B2 | 4/2017 | Fang et al. |
| 10,973,052 B2 * | 4/2021 | Seok ................. H04W 72/0446 |
| 2003/0123420 A1 | 7/2003 | Sherlock |

(Continued)

FOREIGN PATENT DOCUMENTS

| JP | 2013-58836 A | 3/2013 |
| JP | 5356364 B2 | 12/2013 |

(Continued)

OTHER PUBLICATIONS

Asai et al., "Frame Sequence of Interference Management Using Beamforming Technique in OBSS Environment", IEEE 802.11-10/0831r0, Jul. 12, 2010, 30 pages.

(Continued)

*Primary Examiner* — Deepa Belur
(74) *Attorney, Agent, or Firm* — XSENSUS LLP

(57) ABSTRACT

A station device including: a reception unit configured to receive a signal transmitted from another network other than a BSS to which the own device belongs; an acquisition unit configured to acquire parameter information regarding the signal; and a reporting unit configured to report the parameter information to an access point device that performs interference control in the BSS.

10 Claims, 23 Drawing Sheets

(56) References Cited

U.S. PATENT DOCUMENTS

| | | | |
|---|---|---|---|
| 2011/0110251 A1 | 5/2011 | Krishnamurthy et al. | |
| 2013/0170360 A1 | 7/2013 | Xu et al. | |
| 2014/0140208 A1 | 5/2014 | Cherian et al. | |
| 2015/0063327 A1* | 3/2015 | Barriac | H04W 56/0015 370/337 |
| 2015/0078259 A1 | 3/2015 | Junior et al. | |
| 2015/0078299 A1 | 3/2015 | Barriac et al. | |
| 2015/0195777 A1 | 7/2015 | Koskela et al. | |
| 2015/0359008 A1 | 12/2015 | Wang | |
| 2016/0081042 A1 | 3/2016 | Choudhury et al. | |
| 2016/0157195 A1 | 6/2016 | Wang et al. | |
| 2016/0174079 A1 | 6/2016 | Wang et al. | |
| 2016/0330663 A1 | 11/2016 | Zhou et al. | |
| 2018/0220456 A1* | 8/2018 | Kim | H04W 74/06 |
| 2018/0288743 A1 | 10/2018 | Choi et al. | |
| 2019/0215841 A1* | 7/2019 | Sugaya | H04W 72/0446 |
| 2020/0092912 A1 | 3/2020 | Bhanage et al. | |
| 2020/0236134 A1 | 7/2020 | Bhanage et al. | |
| 2021/0014853 A1 | 1/2021 | Wang et al. | |
| 2023/0105964 A1 | 4/2023 | Park et al. | |
| 2023/0216634 A1 | 7/2023 | Tanaka et al. | |

FOREIGN PATENT DOCUMENTS

| | | |
|---|---|---|
| JP | 5360653 B2 | 12/2013 |
| JP | 2016-501465 A | 1/2016 |
| JP | 2016-503244 A | 2/2016 |
| JP | 2016-507183 A | 3/2016 |
| JP | 2016-524377 A | 8/2016 |
| JP | 2018-506219 A | 3/2018 |
| WO | 2016/112306 A1 | 7/2016 |

OTHER PUBLICATIONS

International Search Report mailed on Oct. 17, 2017 for PCT/JP2017/027072 filed on Jul. 26, 2017, 11 pages.

* cited by examiner

FIG. 7

| Version | Length | BSS Color | Tx Power | MCS Index | Uplink Indicator | PHY Parameter | Aggregation | ... |

FIG.8

| Frame Control | Duration | Address 1 | Address 2 | Address 3 | Sequence Control | Address 4 | Qos Control | HT Control |

FIG. 10

| Parameter Record | 1 | 2 | 3 | ... | n |
|---|---|---|---|---|---|
| BCC/Overlap BSS | OBSS | OBSS | BSS | ... | OBSS |
| Detect Time | 01:01:01:01 | 02:02:02:02 | 03:03:03:03 | ... | 04:04:04:04 |
| RSSI | xxx dB | xxx dB | xxx dB | ... | xxx dB |
| Wireless LAN Version | 11ax | 11n | 11ax | ... | 11ax |
| BSS Color Information | 001 | N/A | 010 | ... | 001 |
| Transmit Power Level | -xx dB | -xx dB | -xx dB | ... | -xx dB |
| MCS Information | MCS4 | MCS0 | MCS7 | ... | MCS2 |
| PHY Parameter | TBD | TBD | TBD | ... | TBD |
| Frame Type/Subtype | A-MPDU | ACK | MPDU | ... | MPDU |
| Transmit Duration | xxx μs | xxx μs | xxx μs | ... | xxx μs |
| MAC Layer Parameter | Address 1 | Address 3 | Address 5 | ... | Address 7 |
|  | Address 2 | Address 4 | Address 6 | ... | Address 2 |
| Qos(EDCA)Parameter | VOICE | N/A | VIDEO | ... | VOICE |
|  | Priority 3 | N/A | N/A | ... | Priority 5 |

Columns labeled: 10, 11, 12, 13

FIG. 12

| Element ID | Length | Report MAC Address | OBSS Counts | 1 | | | | ... | ... | n | | |
|---|---|---|---|---|---|---|---|---|---|---|---|---|
| | | | | RSSI | MCS | Type | Duration | | | RSSI | MCS | Type | Duration |

OBSS Receive Parameter Report Information Element — 30

FIG. 13

| Element ID | Length | Report MAC Address | RSSI min level | Detect Counts | 1 | | ... | n | |
|---|---|---|---|---|---|---|---|---|---|
| | | | | | RSSI max | Duration | ... | RSSI max | Duration |
| Energy Detect Parameter Report Information Element | | | | | | | | | |

40

ACQUIRING INTERFERENCE INFORMATION USING OBSS AND WITHOUT MANAGEMENT DEVICE

CROSS-REFERENCE TO RELATED APPLICATIONS

The present application is a continuation of U.S. application Ser. No. 17/870,859, filed Jul. 22, 2022, which is a continuation of U.S. application Ser. No. 16/334,380, filed Mar. 19, 2019 (now U.S. Pat. No. 11,438,778), which is based on PCT filing PCT/JP2017/027072, filed Jul. 26, 2017, which claims priority to JP 2016-186401 filed Sep. 26, 2016, the entire contents of each are incorporated herein by reference.

TECHNICAL FIELD

The present disclosure relates to an access point device, a station device, a wireless control method, a communication control method, and a program.

BACKGROUND ART

In recent years, a working group of IEEE802.11, and the like have been considering standardization of a new wireless LAN. For example, collection methods, usage methods, and the like for interference information used for interference control have been under consideration. For example, Patent Literature 1 discloses a method in which a database server collects interference information, and an access point device acquires interference information from the database server and uses the interference information for interference control. In addition, Patent Literature 2 discloses a method in which a monitoring server collects interference information, and a power control device acquires interference information from the monitoring server and uses the interference information for interference control.

CITATION LIST

Patent Literature

Patent Literature 1: JP 5356364B
Patent Literature 2: JP 5360653B

DISCLOSURE OF INVENTION

Technical Problem

However, the methods in Patent Literature 1 and Patent Literature 2 do not enable an access point device to grasp interference information without using a management device such as a database server or a monitoring server.

Hence, in view of the above circumstances, the present disclosure provides a novel and improved access point device, station device, wireless control method, communication control method, and program that enable the access point device to grasp interference information without using a management device.

Solution to Problem

According to the present disclosure, there is provided a station device including: a reception unit configured to receive a signal transmitted from another network other than a BSS to which the own device belongs; an acquisition unit configured to acquire parameter information regarding the signal; and a reporting unit configured to report the parameter information to an access point device that performs interference control in the BSS.

In addition, according to the present disclosure, there is provided a wireless control method executed by a computer, including: receiving a signal transmitted from another network other than a BSS to which an own device belongs; acquiring parameter information regarding the signal; and reporting the parameter information to an access point device that performs interference control in the BSS.

In addition, according to the present disclosure, there is provided a program causing a computer to implement: receiving a signal transmitted from another network other than a BSS to which an own device belongs; acquiring parameter information regarding the signal; and reporting the parameter information to an access point device that performs interference control in the BSS.

In addition, according to the present disclosure, there is provided an access point device including: a reception unit configured to receive, from a station device, parameter information regarding a signal transmitted from another network other than a BSS to which the own device belongs; and a control unit configured to perform interference control on the basis of the parameter information.

In addition, according to the present disclosure, there is provided a communication control method executed by a computer, including: receiving, from a station device, parameter information regarding a signal transmitted from another network other than a BSS to which an own device belongs; and performing interference control on the basis of the parameter information.

In addition, according to the present disclosure, there is provided a program causing a computer to implement: receiving, from a station device, parameter information regarding a signal transmitted from another network other than a BSS to which an own device belongs; and performing interference control on the basis of the parameter information.

Advantageous Effects of Invention

According to the present disclosure as described above, the access point device can grasp interference information without using a management device.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 7 illustrates a configuration of the PLCP Header in FIG. 6.

FIG. 8 illustrates a configuration of the MAC Header in FIG. 6.

FIG. 10 illustrates an example of parameter information stored by a parameter information storage unit according to the present embodiment.

FIG. 12 illustrates an information element used for transmitting parameter information of an OBSS.

FIG. 13 illustrates an information element used for transmitting energy detection parameter information.

MODE(S) FOR CARRYING OUT THE INVENTION

Figure 1:
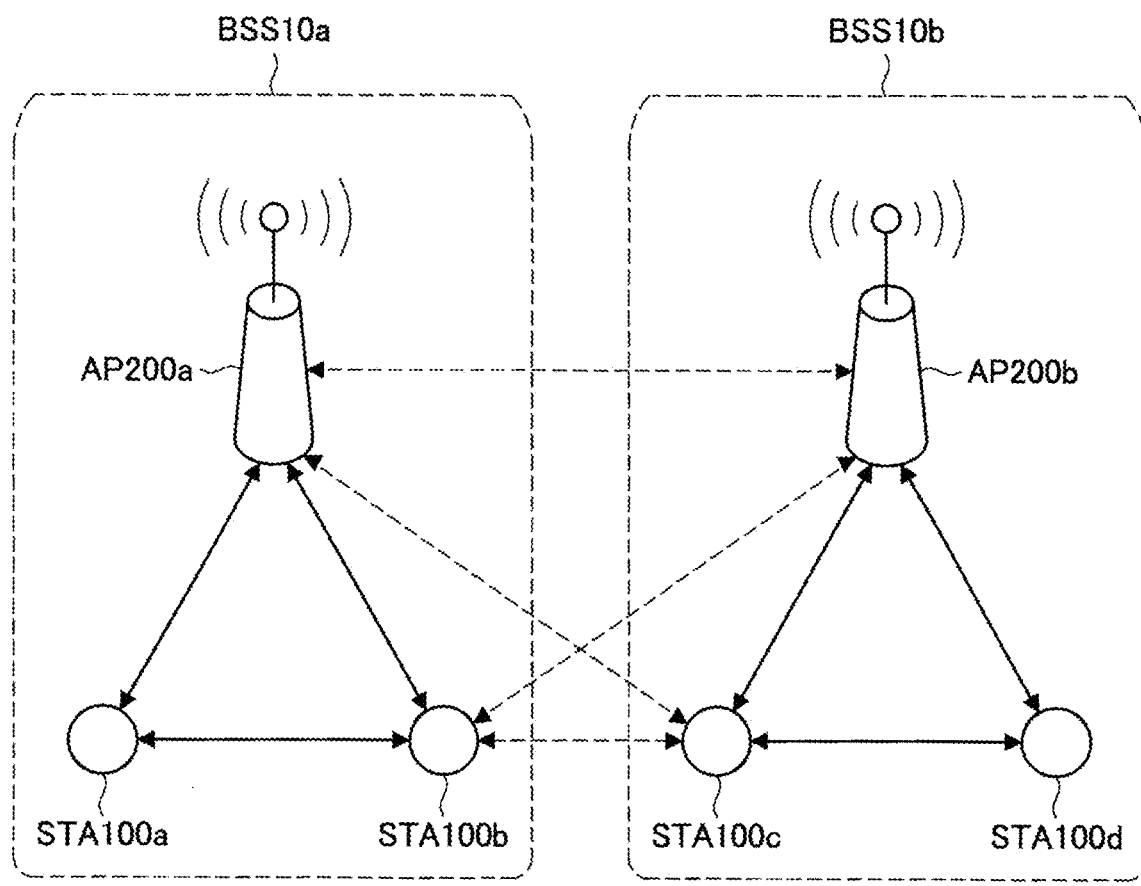
FIG. 1 illustrates a configuration of a wireless LAN system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be given in the following order.
1. Overview of wireless LAN system
2. Configuration of device
3. Operation of device
4. Modifications
5. Application examples
6. Supplemental remarks
7. Conclusion

1. Overview of Wireless LAN System

An embodiment of the present disclosure relates to a wireless LAN system. First, an overview of a wireless LAN system according to an embodiment of the present disclosure is described with reference to FIGS. 1 to 8.

(1-1. Configuration of Wireless LAN System)

FIG. 1 illustrates a configuration of a wireless LAN system according to an embodiment of the present disclosure. As illustrated in FIG. 1, the wireless LAN system according to an embodiment of the present disclosure includes access point devices (hereinafter referred to as "access point (AP)" for convenience) 200 and station devices (hereinafter referred to as "station (STA)" for convenience) 100. Then, one AP 200 and one or more STAs 100 constitute a basic service set (hereinafter referred to as "basic service set (BSS)" for convenience) 10.

The wireless LAN system according to an embodiment of the present disclosure may be installed in any place. For example, the wireless LAN system according to the present embodiment may be installed in office buildings, housing, commercial facilities, public facilities, or the like.

In addition, an area of the BSS 10 according to the present embodiment may overlap with an area of another BSS 10 using an overlapping frequency channel (hereinafter referred to as "overlap basic service set (OBSS)" for convenience); in that case, a signal transmitted from the STA 100 located in the overlap area may interfere with a signal transmitted from the OBSS. When description is given using the example of FIG. 1, an area of the BSS 10a overlaps with part of an area of the BSS 10b that is an OBSS, and the STA 100b and the STA 100c are located in the overlap area. In this case, a signal transmitted from the STA 100b belonging to the BSS 10a may interfere with a signal transmitted from the AP 200b or the STA 100c belonging to the BSS 10b. In addition, a signal transmitted from the STA 100c belonging to the BSS 10b may interfere with a signal transmitted from the AP 200a or the STA 100b belonging to the BSS 10a.

The AP 200 according to the present embodiment is connected to an external network, and provides communication with the external network for the STA 100. For example, the AP 200 is connected to the Internet, and provides communication between the STA 100 and a device on the Internet or a device connected via the Internet.

The STA 100 according to the present embodiment is a wireless device that communicates with the AP 200. The STA 100 may be any wireless device. For example, the STA 100 may be a display with a display function, a memory with a storage function, a keyboard and a mouse with an input function, a speaker with a sound output function, or a smartphone with a function of executing advanced calculation processing.

(1-2. Background)

Then, the background of the present disclosure is described. Before wireless LAN systems have become widely used, an AP had managed each BSS by setting a frequency channel in a manner that a frequency band to be used does not overlap with another BSS; thus, the possibility of signals transmitted from the BSSs interfering with each other had been low. However, in recent years, the widespread use of wireless LAN systems has led to an increase in the number of cases in which frequency bands used in a plurality of adjacent BSSs overlap, which makes signals transmitted from the BSSs more likely to interfere with each other.

To cope with such a situation, the following method has been considered: an AP acquires interference information such as parameter information of a signal transmitted from an OBSS, and changes parameters in communication in a BSS to which the own device belongs (hereinafter referred to as "own BSS" for convenience) on the basis of the interference information, thereby preventing occurrence of interference. Examples include a method in which the AP changes transmission power to a low value on the basis of information of interference with the OBSS, and makes a radio wave reachable range smaller, thereby preventing occurrence of interference.

Figure 2:
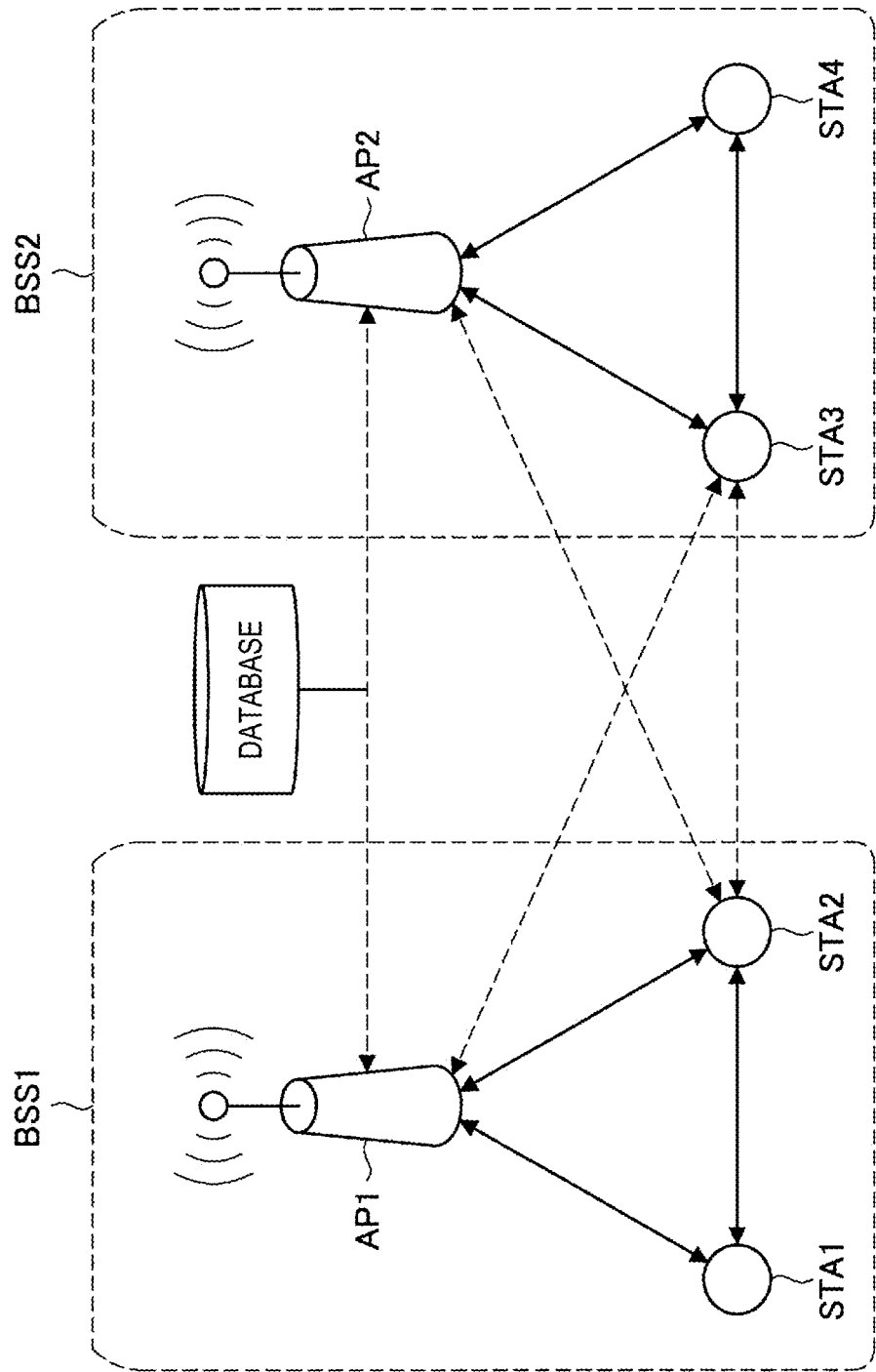
FIG. 2 illustrates a configuration of a wireless LAN system according to Patent Literature 1.

Here, Patent Literature 1 and Patent Literature 2 disclose examples of methods for collecting, managing, and using interference information. Hence, disclosure of Patent Literature 1 will now be described with reference to FIG. 2. FIG. 2 illustrates a configuration of a wireless LAN system according to Patent Literature 1. As illustrated in FIG. 2, in the wireless LAN system according to Patent Literature 1, a BSS 1 includes an AP 1, an STA 1, and an STA 2, and a BSS 2 includes an AP 2, an STA 3, and an STA 4. Then, an area of the BSS 1 overlaps with part of an area of the BSS 2 that is an OBSS, and the STA 2 and the STA 3 are located in the overlap area.

In addition, the wireless LAN system according to Patent Literature 1 includes a database connected to the AP 1 and the AP 2 via a network. In the wireless LAN system, the database acquires interference information from each AP and manages the interference information. Then, each AP acquires interference information from the database, and changes parameters in communication in the own BSS on the basis of the interference information, thereby preventing occurrence of interference.

In addition, although not illustrated, in the disclosure of Patent Literature 2, a monitoring server connected to each AP via a network receives interference information from the AP and manages the interference information. Then, a power control device connected to the monitoring server acquires interference information from the monitoring server, and decides transmission power of each AP on the basis of the interference information.

As described above, in the disclosure of Patent Literature 1 and the disclosure of Patent Literature 2, a management device that collects and manages interference information (referring to the database in Patent Literature 1 and referring to the monitoring server in Patent Literature 2) exists separately from an AP, and the AP acquires interference information from the management device. Here, for example, it is considered to be inappropriate, in terms of cost-effectiveness, to take the trouble to provide a management device even in the case where the number of wireless LANs is small. In addition, from another viewpoint, in the case where a malfunction occurs in a network connecting the management device and each AP, each AP cannot acquire interference information from the management device, and thus cannot perform interference control.

Hence, the disclosing party of the present case has devised the present disclosure by focusing on the above circumstances. The AP 200 according to an embodiment of the present disclosure can grasp interference information without using a management device. Then, the AP 200 can exchange the interference information with another AP 200. Furthermore, the AP 200 can appropriately perform interference control on the basis of the interference information. Described below are a functional overview, a configuration, operation, modifications, and application examples of a wireless LAN system according to an embodiment of the present disclosure.

(1-3. Functional Overview of Wireless LAN System)

The background of the present disclosure has been described above. Now, a functional overview of a wireless LAN system according to an embodiment of the present disclosure will be described.

In the case of receiving signals of the own BSS or an OBSS, the STA 100 in the wireless LAN system according to the present embodiment reports parameter information regarding these signals to the AP 200, instead of a management device as in Patent Literatures. More specifically, in the case of receiving signals of the own BSS or an OBSS, the STA 100 stores parameter information regarding a modulation scheme, transmission power, a BSS identifier, a received signal strength indicator (RSSI), a transmission path utilization time, or the like in a state where the own BSS is distinguished from an OBSS, and reports the parameter information to the AP 200.

Figure 3:
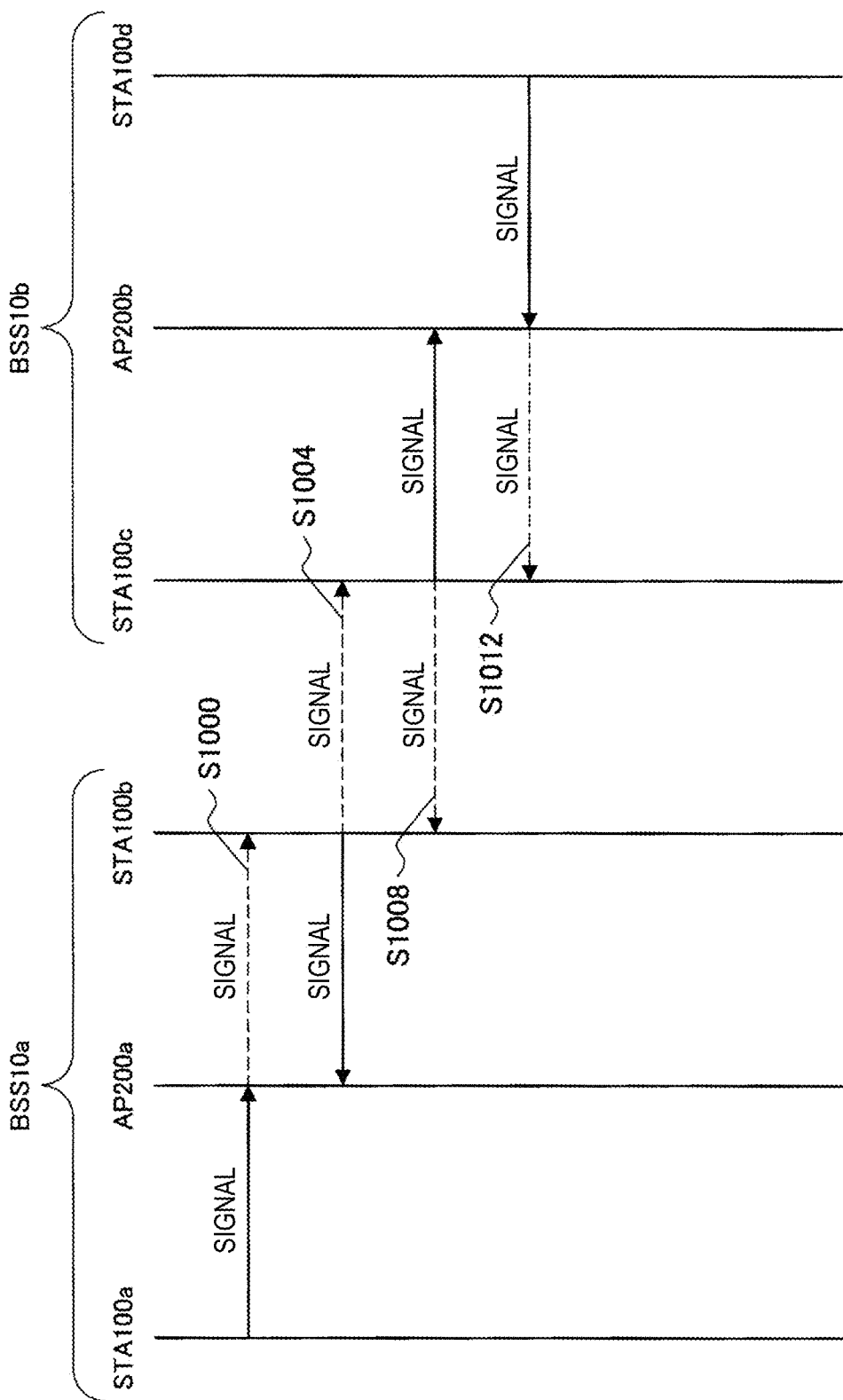
FIG. 3 is a sequence diagram illustrating the operation of an STA according to the present embodiment acquiring parameter information.

Here, an overview of the operation of the STA 100 acquiring parameter information is described with reference to FIG. 3. FIG. 3 is a sequence diagram illustrating the operation of the STA 100 according to the present embodiment acquiring parameter information.

In step S1000, it is assumed that, in the case where the STA 100*a* transmits a signal to the AP 200*a*, not only the AP 200*a* but also the STA 100*b* receives the signal. In this case, the STA 100*b* stores parameter information of the signal as parameter information of the own BSS. Note that also the AP 200*a* that has received the signal stores parameter information of the signal as parameter information of the own BSS.

In step S1004, the STA 100*b* transmits a signal to the AP 200*a*. Then, it is assumed that not only the AP 200*a* but also the STA 100*c* receives the signal. In this case, the STA 100*c* stores parameter information of the signal as parameter information of an OBSS. Note that the AP 200*a* that has received the signal stores parameter information of the signal as parameter information of the own BSS.

In step S1008, the STA 100*c* transmits a signal to the AP 200*b*. Then, it is assumed that not only the AP 200*b* but also the STA 100*b* receives the signal. In this case, the STA 100*b* stores parameter information of the signal as parameter information of an OBSS. Note that the AP 200*b* that has received the signal stores parameter information of the signal as parameter information of the own BSS.

In step S1012, the STA 100*d* transmits a signal to the AP 200*b*. Then, it is assumed that not only the AP 200*b* but also the STA 100*c* receives the signal. In this case, the STA 100*c* stores parameter information of the signal as parameter information of the own BSS. Note that also the AP 200*b* that has received the signal stores parameter information of the signal as parameter information of the own BSS.

Figure 4:
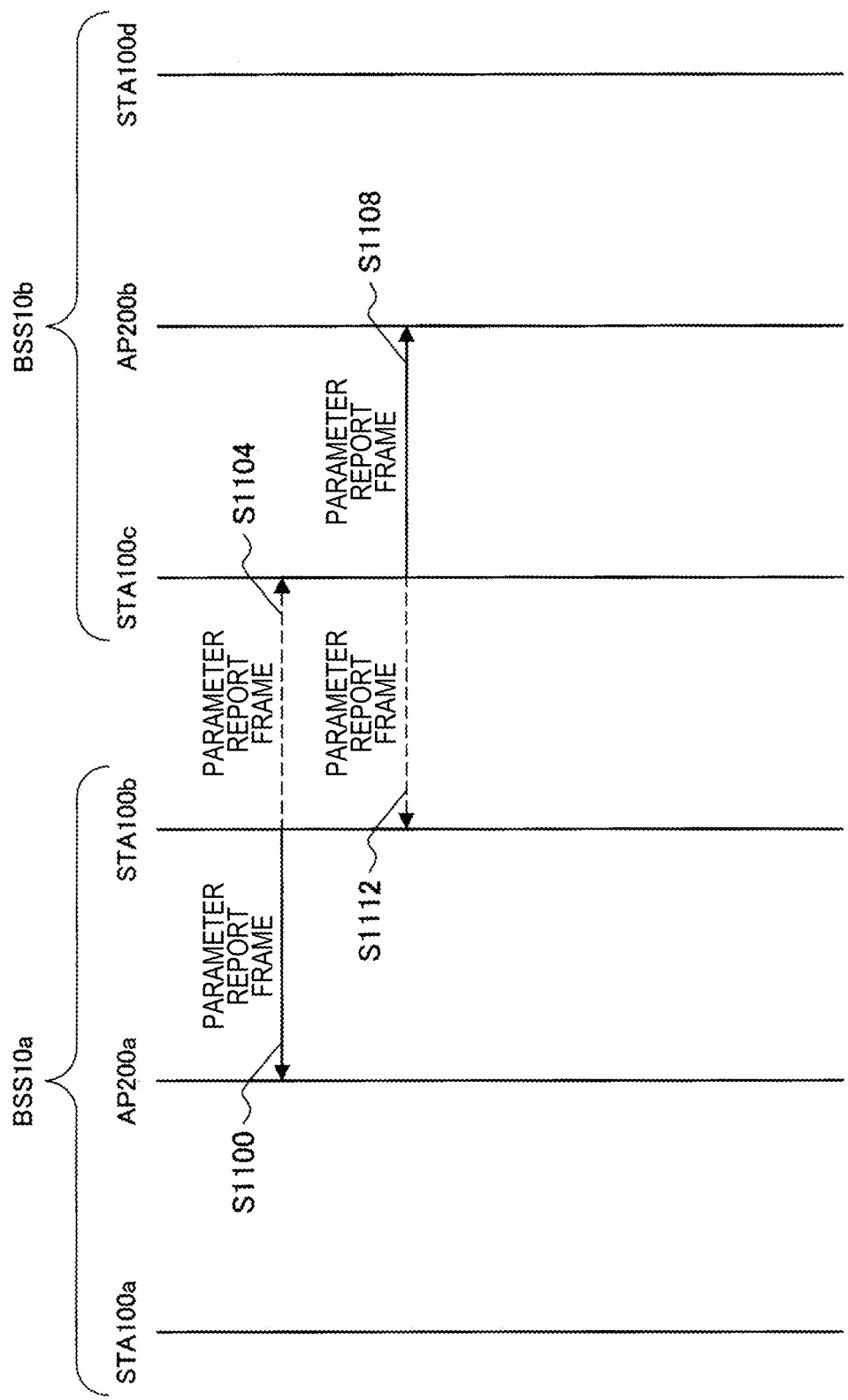
FIG. 4 is a sequence diagram illustrating the operation of an STA according to the present embodiment transmitting parameter information to an AP.

As described above, each STA 100 acquires parameter information of the own BSS or parameter information of an OBSS. Now, an overview of the operation of the STA 100 reporting parameter information to the AP 200 will be described with reference to FIG. 4. FIG. 4 is a sequence diagram illustrating the operation of the STA 100 according to the present embodiment transmitting parameter information to the AP 200.

In step S1100, the STA 100*b* generates a frame including parameter information of the own BSS or an OBSS, and transmits the frame to the AP 200*a*. This enables the AP 200*a* to grasp that an OBSS exists and that the STA 100*b* has received a signal of the OBSS. Thus, the AP 200*a* can perform interference control by changing parameters such as transmission power, a modulation scheme, or a frequency band. In addition, in step S1104, the STA 100*c* can grasp that parameter information has been reported from the STA 100*b* to the AP 200*a*. Thus, for example, the STA 100*c* may be triggered by the reporting of parameter information from the STA 100*b* to the AP 200*a* to report parameter information to the AP 200*b*.

In step S1108, the STA 100c generates a frame including parameter information of the own BSS or an OBSS, and transmits the frame to the AP 200b. This enables the AP 200b to grasp that an OBSS exists and that the STA 100c has received a signal of the OBSS. Thus, as described above, the AP 200b can perform interference control by changing parameters such as transmission power, a modulation scheme, or a frequency band to be used. In addition, in step S1112, as described above, the STA 100b can grasp that parameter information has been reported from the STA 100c to the AP 200b.

As described above, the AP 200 can acquire parameter information of a signal of the own BSS or an OBSS from each STA 100. Then, the AP 200 stores these pieces of parameter information in association with identification information of the acquisition source STA 100. Hereinafter, parameter information that the AP 200 acquires from each STA 100 and stores will be referred to as aggregate parameter information. Aggregate parameter information may be information obtained by editing parameter information reported from each STA 100, or may be, of course, information obtained by merely associating identification information of the acquisition source STA 100 with parameter information reported from each STA 100.

Figure 5:
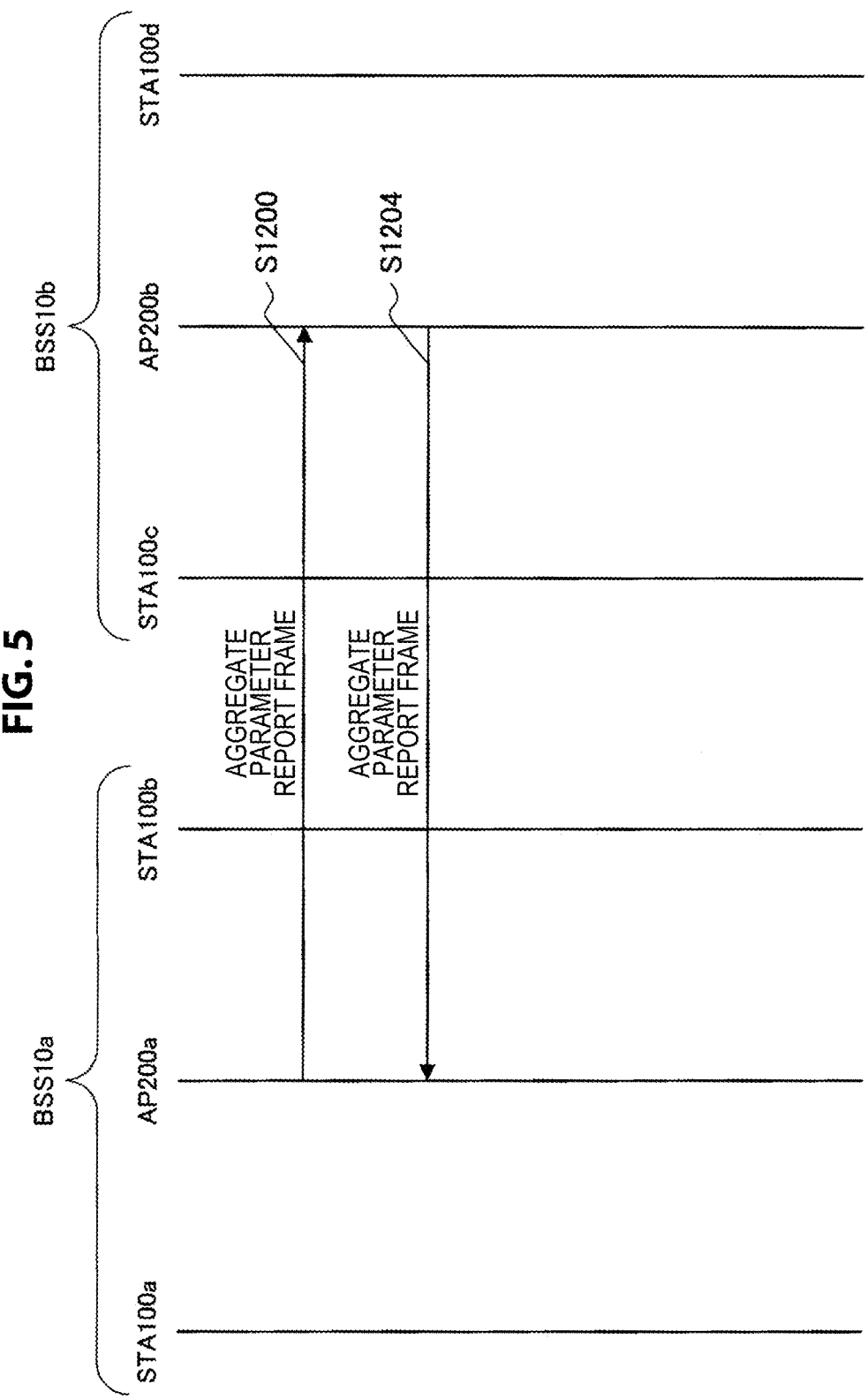
FIG. 5 is a sequence diagram illustrating the operation of APs according to the present embodiment exchanging aggregate parameter information.

Then, the APs 200 exchange individually stored aggregate parameter information, thereby grasping parameter information set for different BSSs and an interference situation between BSSs. Now, an overview of the operation of the APs 200 exchanging aggregate parameter information will be described with reference to FIG. 5. FIG. 5 is a sequence diagram illustrating the operation of the APs 200 according to the present embodiment exchanging aggregate parameter information.

In step S1200, the AP 200a transmits aggregate parameter information, and the AP 200b receives the aggregate parameter information. This enables the AP 200b to grasp parameter information set in the BSS 10a and influence of interference received by a device of the BSS 10a. Thus, the AP 200b can appropriately perform interference control by changing parameter information. In addition, in step S1204, the AP 200b transmits aggregate parameter information, and the AP 200a receives the aggregate parameter information. As described above, this enables the AP 200a to grasp parameter information set in the BSS 10b and influence of interference received by a device of the BSS 10b, and to appropriately perform interference control by changing parameter information.

As described above, in the wireless LAN system according to the present embodiment, the STA 100 reports parameter information of the own BSS or an OBSS to the AP 200, which enables the AP 200 to grasp interference information without using a management device. In addition, the AP 200 can aggregate parameter information reported from the STA 100, and exchange aggregate parameter information between the APs 200, thereby grasping parameter information set in different BSSs and an interference situation between BSSs. Then, the AP 200 can appropriately perform interference control by changing parameter information of the own BSS on the basis of aggregate parameter information.

(1-4. Frame Configuration)

The functional overview of the wireless LAN system according to an embodiment of the present disclosure has been described above. Now, a configuration of a frame transmitted and received by the wireless LAN system according to the present embodiment will be described with reference to FIGS. 6 to 8.

Figure 6:
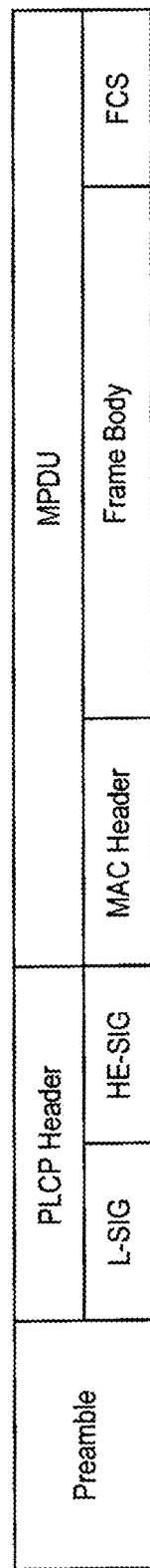
FIG. 6 illustrates a configuration of a frame transmitted and received in a wireless LAN system according to the present embodiment.

FIG. 6 illustrates a configuration of a frame transmitted and received in the wireless LAN system according to the present embodiment. As illustrated in FIG. 6, a frame transmitted and received by the wireless LAN system according to the present embodiment is a PPDU including Preamble, PLCP Header, and MPDU. The PLCP Header includes L-SIG and HE-SIG. The MPDU includes MAC Header, Frame Body, and Frame Check Sequence (FCS).

FIG. 7 illustrates a configuration of the PLCP Header in FIG. 6. As illustrated in FIG. 7, the PLCP Header includes BSS Color, Tx Power, MCS Index, Uplink Indicator, and the like. The BSS Color is information for identifying a BSS of a transmitted and received signal. For example, BSS Color of a signal transmitted and received in a certain BSS contains BSS Color information corresponding to the BSS, and BSS Color of aggregate parameter information or the like transmitted and received between different BSSs contains wildcard BSS Color information. The STA 100 or the AP 200 that has received a signal determines whether or not the signal is a signal of the own BSS, or whether or not the signal is a signal communicated across BSSs, on the basis of BSS Color. In addition, the Tx Power is transmission power information. In addition, the MCS Index is obtained by indexing a combination of a modulation scheme, a coding rate, and the like. In addition, the Uplink Indicator is a signal transmission direction, indicates that the signal is an uplink signal in the case where the Uplink Indicator is 1, and indicates that the signal is a downlink signal in the case where the Uplink Indicator is 0, for example.

FIG. 8 illustrates a configuration of the MAC Header in FIG. 6. As illustrated in FIG. 8, the MAC Header includes Frame Control, Address 1 to Address 4, Sequence Control, Qos Control, HT Control, and the like. The Frame Control contains information of a protocol version, a frame time, or the like, and Address 1 to Address 4 contain information of a BSSID, a transmission source address, a destination address, or the like. The Sequence Control contains a sequence number, the Qos Control contains a Qos parameter, and the HT Control contains a high-speed communication parameter.

2. Configuration of Device

Figure 9:
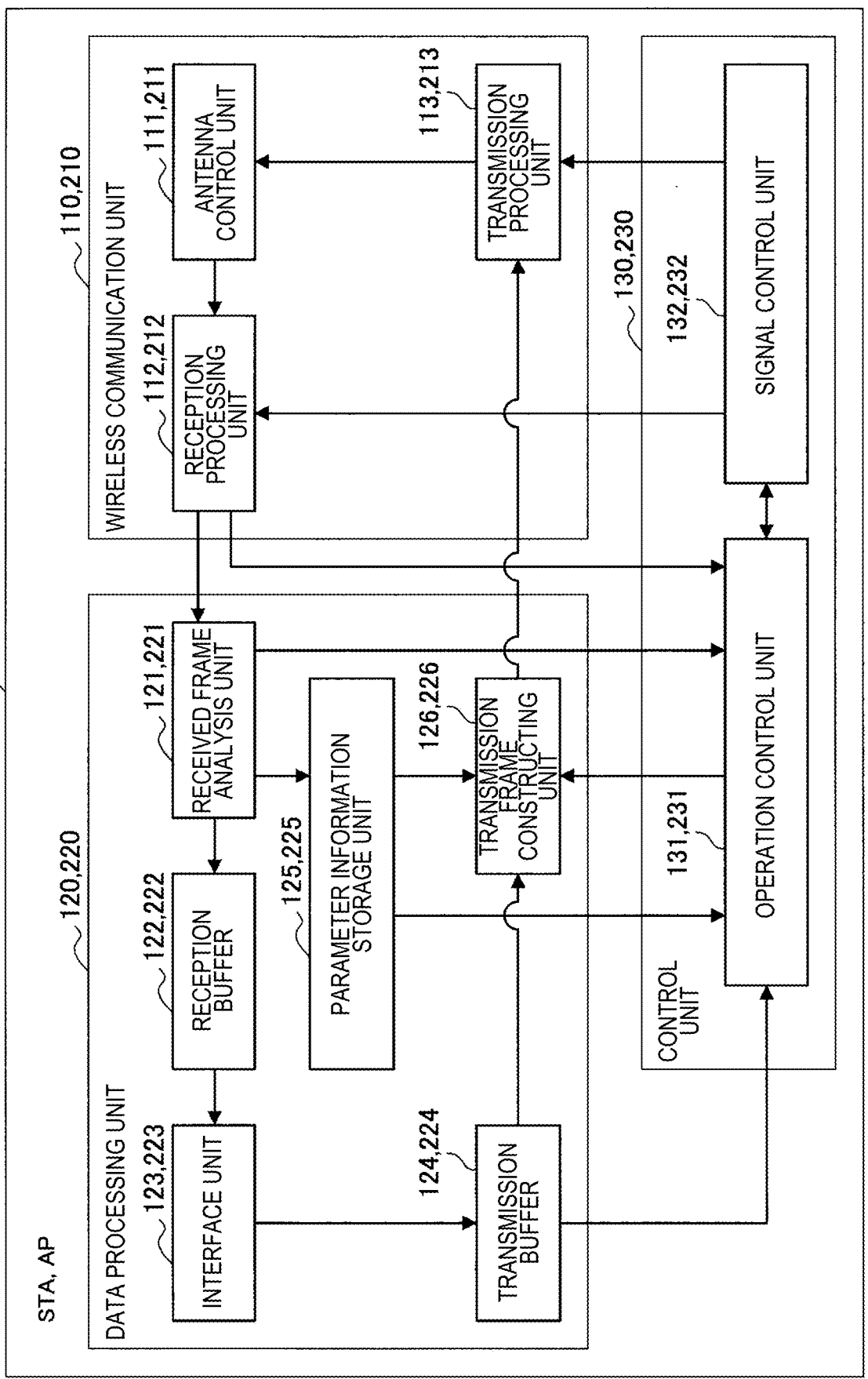
FIG. 9 illustrates configurations of an STA and an AP according to the present embodiment.

The functional overview of the wireless LAN system according to an embodiment of the present disclosure has been described above. Now, configurations of the STA 100 and the AP 200 according to the present embodiment will be described with reference to FIG. 9. FIG. 9 illustrates configurations of the STA 100 and the AP 200 according to the present embodiment.

(2-1. Configuration of STA)

First, a configuration of the STA 100 is described. As illustrated in FIG. 9, the STA 100 includes a wireless communication unit 110, a data processing unit 120, and a control unit 130.

(Wireless Communication Unit)

As illustrated in FIG. 9, the wireless communication unit 110 includes an antenna control unit 111, a reception processing unit 112, and a transmission processing unit 113, and functions as a reception unit and a reporting unit.

The antenna control unit 111 controls transmission and reception of signals via at least one antenna. More specifically, the antenna control unit 111 provides the signal received via the antenna to the reception processing unit 112, and transmits the signal generated by the transmission processing unit 113 via the antenna.

The reception processing unit 112 performs frame reception processing on the basis of the signal provided from the antenna control unit 111. For example, the reception processing unit 112 outputs a baseband reception signal by performing analog processing and down-conversion on a signal obtained from an antenna. Then, the reception processing unit 112 calculates correlation between a predetermined signal pattern and the reception signal, while shifting the reception signal that is a target of computation on a time axis, and detects a preamble on the basis of appearance of a peak of correlation. Thus, the reception processing unit 112 can detect a signal of the own BSS, a signal of an OBSS, or the like. In addition, the reception processing unit 112 acquires a frame by performing demodulation, decoding, and the like on the baseband reception signal, and provides the acquired frame to a received frame analysis unit 121. In addition, the reception processing unit 112 provides information regarding success or failure of reception processing to an operation control unit 131. For example, in the case of failing in reception processing such as demodulation, the reception processing unit 112 provides error occurrence information to the operation control unit 131. In addition, in the case of receiving a signal that cannot be detected by computing correlation with a predetermined signal pattern (i.e., a signal not including a wireless-LAN-standard preamble), the reception processing unit 112 provides the information to the received frame analysis unit 121.

The transmission processing unit 113 performs transmission processing of a frame provided from a transmission frame constructing unit 126. More specifically, the transmission processing unit 113 generates a transmission signal on the basis of a frame provided from the transmission frame constructing unit 126 and a parameter set in accordance with an instruction from a signal control unit 132. For example, the transmission processing unit 113 generates a baseband transmission signal by performing encoding, interleaving, and modulation on the frame provided from the transmission frame constructing unit 126 in accordance with coding and modulation schemes and the like instructed by the signal control unit 132. In addition, the transmission processing unit 113 performs up-conversion on the baseband transmission signal obtained by the preceding processing.

(Data Processing Unit)

As illustrated in FIG. 9, the data processing unit 120 includes the received frame analysis unit 121, a reception buffer 122, an interface unit 123, a transmission buffer 124, a parameter information storage unit 125, and the transmission frame constructing unit 126.

The received frame analysis unit 121 functions as a determination unit and an acquisition unit, and performs analysis of a received frame, acquisition of parameter information, or the like. More specifically, the received frame analysis unit 121 analyzes PLCP Header, MAC Header, and the like included in a frame received by the wireless communication unit 110. Then, the received frame analysis unit determines whether or not the reception signal is a signal of the own BSS on the basis of BSS Color or a BSSID that is identification information.

In the case where it is determined that the reception signal is a signal of the own BSS, the received frame analysis unit 121 acquires parameters, and causes the parameter information storage unit 125 to store the parameters as parameter information of the own BSS (referring to second parameter information). In addition, in the case where it is determined that the reception signal is not a signal of the own BSS, the received frame analysis unit 121 acquires parameters, and causes the parameter information storage unit 125 to store the parameters as parameter information of an OBSS. In addition, in the case where information indicating that a signal not including a wireless-LAN-standard preamble is received is provided from the reception processing unit 112, the received frame analysis unit 121 acquires parameters, and causes the parameter information storage unit 125 to store the parameters as energy detection parameter information.

In addition, in the case where a parameter information report request from the AP 200 is received, the received frame analysis unit 121 provides the information to the operation control unit 131, and, in the case where aggregate parameter information from the AP 200 is received, provides the information to the operation control unit 131. Furthermore, in the case where a frame destination includes the own device, the received frame analysis unit 121 acquires data or the like from the frame, and causes the reception buffer 122 to store the data or the like.

The reception buffer 122 stores data included in a received frame.

The interface unit 123 is an interface connected to another component included in the STA 100. More specifically, the interface unit 123 performs reception of data that is desired to be transmitted from the other component, for example, an application or a user interface, provision of reception data to the application or the user interface, or the like.

The transmission buffer 124 stores transmission data provided from the interface unit 123.

The parameter information storage unit 125 stores parameter information of the own BSS, parameter information of an OBSS, and energy detection parameter information provided from the received frame analysis unit 121. Here, an example of information stored by the parameter information storage unit 125 is described with reference to FIG. 10. FIG. 10 illustrates an example of parameter information stored by the parameter information storage unit 125 according to the present embodiment.

As illustrated in FIG. 10, the parameter information storage unit 125 creates a record for each reception signal, and stores parameter information. Then, the parameter information storage unit 125 adds information of a transmission source network of the reception signal. More specifically, the parameter information storage unit 125 makes it possible to distinguish whether the reception signal is a signal of the own BSS or a signal of an OBSS by containing information of the own BSS or an OBSS in "BSS/Overlap BSS column" in the record (it is written "BSS" instead of "own BSS" in parameter information of the own BSS). For example, a record 10, a record 11, and a record 13 of FIG. 10 are parameter information of a signal of an OBSS, and a record 12 is parameter information of a signal of the own BSS. Although not illustrated, in the case where the reception signal is a signal of a network other than a wireless LAN, such as a cellular network, "BSS/Overlap BSS column" may contain "N/A" or the like, or may contain some sort of identification information. For example, a type defined by EDCA, for example, or the like may be contained as version information, a frame type format, a subtype format, an aggregation format, or a QoS parameter of a wireless LAN.

The transmission frame constructing unit 126 generates a transmission frame. For example, the transmission frame constructing unit 126 generates a parameter report frame on the basis of parameter information stored in the parameter information storage unit 125 and control information set by the operation control unit 131. The transmission frame constructing unit 126 generates a frame (packet) from parameter information for transmission acquired from the parameter information storage unit 125, and performs processing of adding a MAC header for medium access control (MAC) and an error detection code to the generated frame and the like. In addition, the transmission frame constructing unit 126 may generate a transmission frame by using transmission data contained in the transmission buffer 124.

Figure 11:
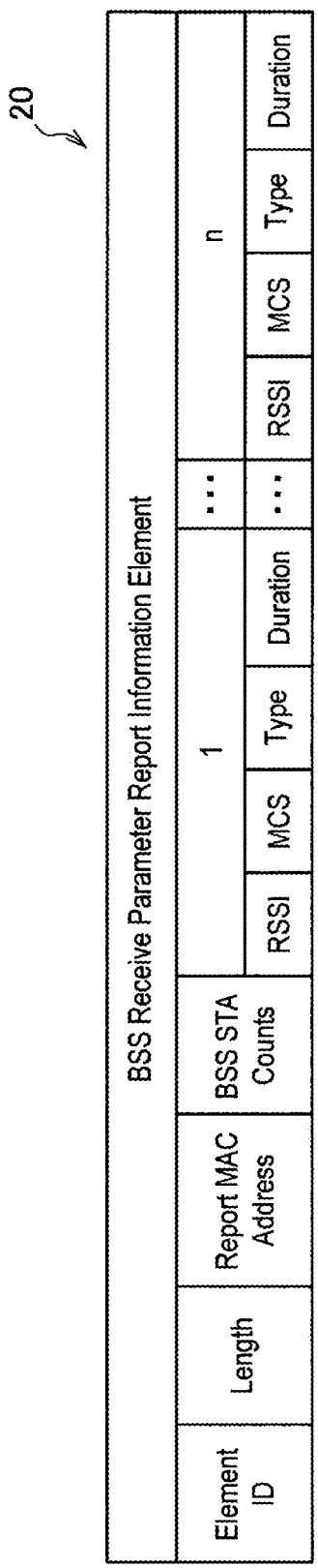
FIG. 11 illustrates an information element used for transmitting parameter information of a BSS.

Here, an example of a parameter report frame generated by the transmission frame constructing unit 126 is described with reference to FIGS. 11 to 13. FIG. 11 illustrates an information element 20 used for transmitting parameter information of the own BSS. As illustrated in FIG. 11, the information element 20 includes Element ID, Length, Report MAC Address, BSS STA Counts, parameter information for each reception signal, and the like. The Element ID is information of a type of information element, the Length is information of a length of the information element 20, the Report MAC Address is information of a report destination address, and the BSS STA Counts is information of the number of own BSS signals to be reported. In addition, parameter information for each own BSS signal can include RSSI, MCS, Type, Duration, and the like, but may be changed as appropriate. Here, the Type is information indicating a type of data, and the Type may include, for example, version information of a wireless LAN frame, information regarding whether or not it is configured by aggregation as a type of frame, or information regarding voice, video, or the like included in data. In addition, the Duration is information regarding a transmission path utilization time. FIG. 11 is an example, and contents of the information element 20 may be changed as appropriate.

FIG. 12 illustrates an information element 30 used for transmitting parameter information of an OBSS. As illustrated in FIG. 12, the information element 30 includes Element ID, Length, Report MAC Address, OBSS Counts, parameter information for each reception signal, and the like. The OBSS Counts is information of the number of OBSS signals to be reported. Other information is similar to that of the information element 20 in FIG. 11; hence, description is omitted. FIG. 12 is an example, and contents of the information element 30 may be changed as appropriate.

FIG. 13 illustrates an information element 40 used for transmitting energy detection parameter information. As illustrated in FIG. 13, the information element 40 includes Element ID, Length, Report MAC Address, RSSI min level, Detect Counts, parameter information for each reception signal, and the like. The RSSI min level is information of the lowest RSSI. Detect Counts is information of the number of signals to be reported. In addition, parameter information for each signal can include RSSI max and Duration, but may be changed as appropriate. Here, the RSSI max is information of the highest RSSI for each signal. FIG. 13 is an example, and contents of the information element 40 may be changed as appropriate.

Each information element illustrated in FIGS. 11 to 13 is contained in the Frame Body of FIG. 6 and transmitted. At this time, each information element may be contained in the Frame Body alone, or a plurality of information elements may be coupled and contained in the Frame Body.

(Control Unit)

As illustrated in FIG. 9, the control unit 130 includes the operation control unit 131 and the signal control unit 132.

The operation control unit 131 controls processing related to transmission of parameter information. More specifically, the operation control unit 131 controls transmission processing of parameter information of the own BSS, parameter information of an OBSS, or energy detection parameter information. For example, in the case of determining that an error has occurred at a predetermined frequency or more on the basis of error occurrence information provided from the reception processing unit 112, the operation control unit 131 controls each component so as to transmit parameter information. In addition, in the case where predetermined time or more passes from timing at which parameter information has been transmitted previously, the operation control unit 131 similarly controls each component so as to transmit parameter information. In addition, in the case where information indicating that a parameter information report request from the AP 200 is received is provided from the reception processing unit 112, the operation control unit 131 similarly controls each component so as to transmit parameter information. These timings at which parameter information is transmitted may be changed freely. By the above method, the operation control unit 131 can control each component so as to transmit parameter information at appropriate timing.

The signal control unit 132 controls an operation of the wireless communication unit 110. More specifically, the signal control unit 132 controls transmission/reception processing of the wireless communication unit 110. For example, the signal control unit 132 causes the wireless communication unit 110 to set control information for transmission and reception on the basis of an instruction from the operation control unit 131. In addition, the signal control unit 132 controls vacant channel detection processing as in CSMA/CA. For example, the signal control unit 132 decides transmission start or transmission standby of a signal on the basis of a carrier sense result and back off time.

(2-2. Configuration of AP)

The AP 200 may include components similar to those of the STA 100. Of course, the AP 200 may include a component not included in the STA 100 as appropriate.

(Wireless Communication Unit)

As illustrated in FIG. 9, the wireless communication unit 210 includes an antenna control unit 211, a reception processing unit 212, and a transmission processing unit 213, and functions as a reception unit and a reporting unit. The functions of the components are similar to those of the STA 100; hence, description is omitted.

(Data Processing Unit)

As illustrated in FIG. 9, the data processing unit 220 includes a received frame analysis unit 221, a reception buffer 222, an interface unit 223, a transmission buffer 224, a parameter information storage unit 225, and a transmission frame constructing unit 226. Hereinafter, of the functions of the components, description of a function similar to that of a component of the STA 100 is omitted.

The received frame analysis unit 221 functions as a generation unit, and performs analysis of a received frame, and processing related to parameter information and aggregate parameter information. More specifically, in the case where a frame including parameter information is received from the STA 100, the received frame analysis unit 221 analyzes the frame, and acquires parameter information. Then, the received frame analysis unit 221 generates aggregate parameter information on the basis of the parameter information, and causes the parameter information storage unit 225 to store the aggregate parameter information. At this time, the received frame analysis unit 221 causes the parameter information storage unit 225 to store the aggregate parameter information in association with identification information of the transmission source STA 100. In addition, as described above, the received frame analysis unit 221 may generate aggregate parameter information by editing parameter information transmitted from the STA 100.

In addition, in the case where aggregate parameter information transmitted from another AP 200 is received, the received frame analysis unit 221 causes the parameter information storage unit 225 to store the aggregate parameter information in association with identification information of the transmission source AP 200. In addition, the received frame analysis unit 221 may edit aggregate parameter information transmitted from another AP 200, and cause the parameter information storage unit 225 to store the edited aggregate parameter information.

The parameter information storage unit 225 stores aggregate parameter information provided from the received frame analysis unit 221.

The transmission frame constructing unit 226 generates a transmission frame. For example, the transmission frame constructing unit 226 is controlled by an operation control unit 231 to generate a parameter information report request frame. In addition, the transmission frame constructing unit 226 is controlled by the operation control unit 231 to generate a frame including aggregate parameter information.

(Control Unit)

As illustrated in FIG. 9, the control unit 230 includes the operation control unit 231 and a signal control unit 232. Hereinafter, of the functions of the components, description of a function similar to that of a component of the STA 100 is omitted.

The operation control unit 231 controls processing related to parameter information, aggregate parameter information, and interference control. For example, the operation control unit 231 controls processing related to a parameter information report request. The operation control unit 231 controls each component so as to generate and transmit a frame for a parameter information report request. Here, a parameter information report request may be made at any timing. For example, the operation control unit 231 may make a parameter information report request after predetermined time elapses from timing at which a parameter information report request has been made previously. In addition, the operation control unit 231 may make a parameter information report request in the case of determining that error occurrence frequency is equal to or greater than a predetermined threshold, on the basis of error occurrence information provided from the reception processing unit 212.

In addition, the operation control unit 231 controls processing of reporting aggregate parameter information to another AP 200. The operation control unit 231 controls each component so as to generate a frame including aggregate parameter information stored by the parameter information storage unit 225, and report the frame to another AP 200. Here, aggregate parameter information may be reported at any timing. For example, the operation control unit 231 may report aggregate parameter information after predetermined time elapses from timing at which aggregate parameter information has been reported previously. In addition, the operation control unit 231 may report aggregate parameter information in the case of determining that error occurrence frequency is equal to or greater than a predetermined threshold, on the basis of error occurrence information provided from the reception processing unit 212.

In addition, the operation control unit 231 performs processing related to interference control. More specifically, the operation control unit 231 performs interference control on the basis of aggregate parameter information generated by using parameter information from the STA 100 or aggregate parameter information received from another AP 200.

For example, in the case of determining that communication environment is poor on the basis of aggregate parameter information, the operation control unit 231 changes a modulation scheme to a modulation scheme with low transmission efficiency (BPSK etc.) enabling communication more reliably, or changes transmission power to higher transmission power allowed in the standard. In addition, the operation control unit 231 may change setting in a manner that a frequency band different from a frequency band used in an OBSS is used.

In addition, the operation control unit 231 may perform interference control on the basis of information regarding priority of data included in aggregate parameter information. More specifically, in the case where it can be confirmed that communication of data with high priority, such as voice, is performed in an OBSS on the basis of the Type included in aggregate parameter information, the operation control unit 231 may change parameters in a manner that communication of the OBSS is performed preferentially. In addition, in the case where it can be confirmed that communication of data with high priority is not performed in an OBSS on the basis of the Type included in aggregate parameter information, the operation control unit 231 may change parameters in a manner that communication of the own BSS is performed preferentially. Alternatively, in this case, the operation control unit 231 may perform determination again after parameters of the OBSS are changed, without changing parameters of the own BSS.

3. Operation of Device

Figure 14A:
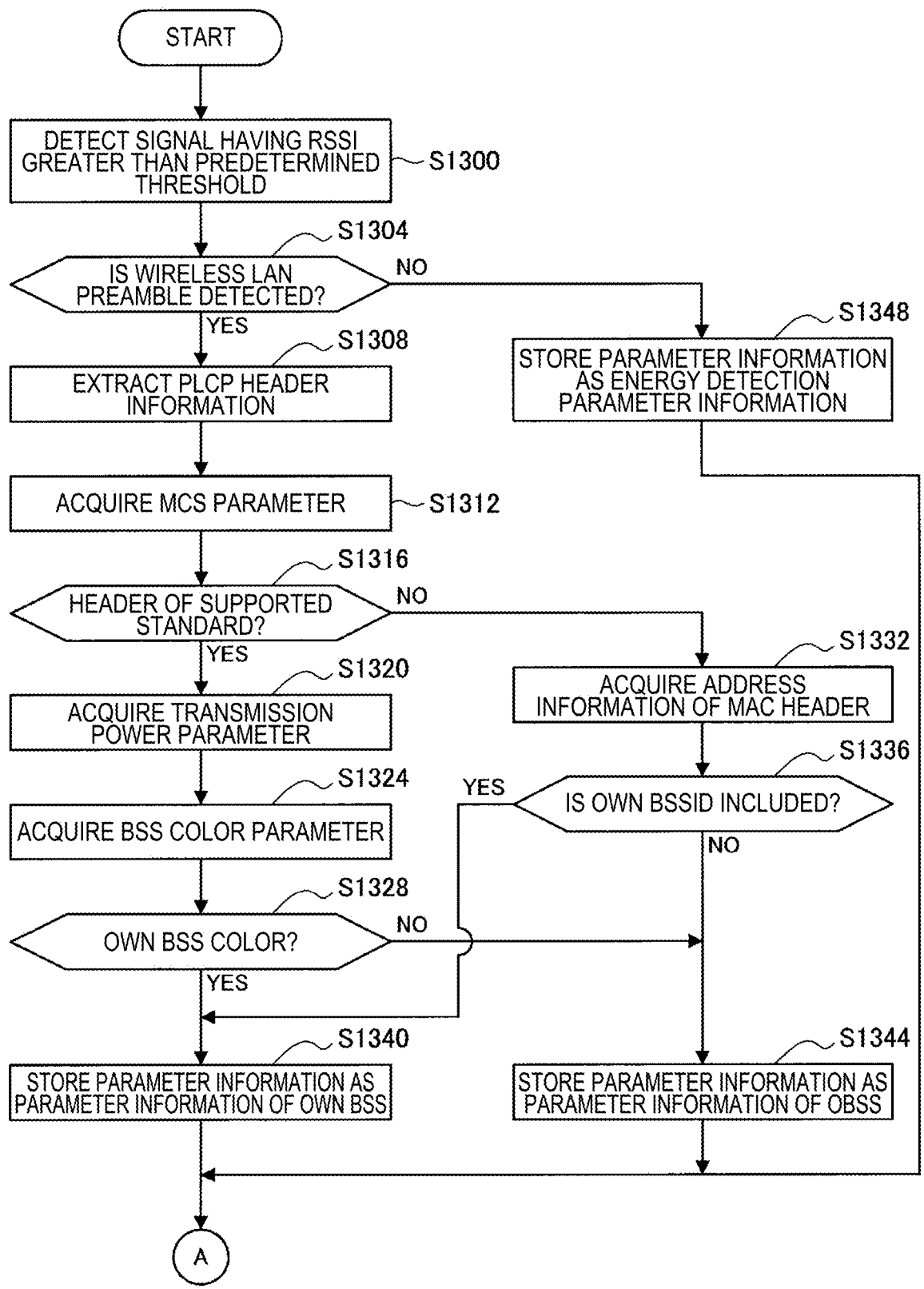
FIG. 14A is a flowchart illustrating the operation of an STA according to the present embodiment acquiring parameter information.
Figure 14B:
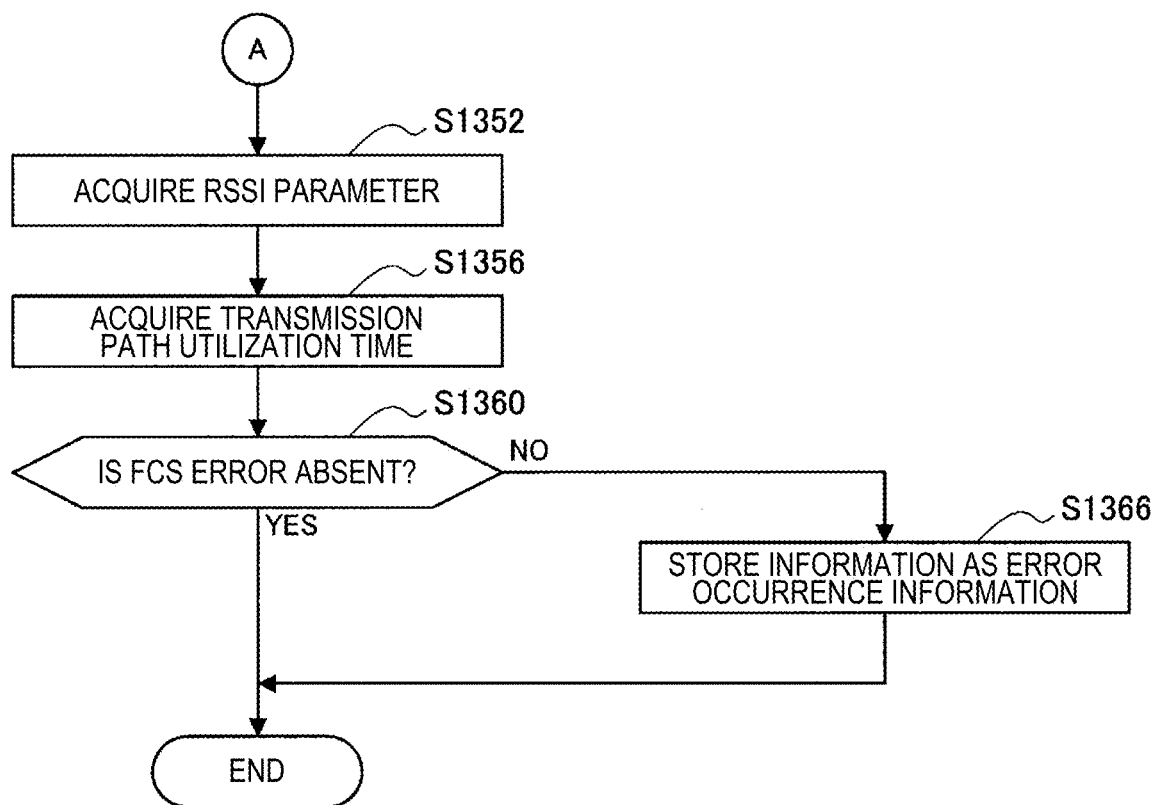
FIG. 14B is a flowchart illustrating the operation of an STA according to the present embodiment acquiring parameter information.

The configurations of the STA 100 and the AP 200 according to the present embodiment have been described above. Now, parameter information acquisition operation will be described with reference to FIGS. 14A and 14B. FIGS. 14A and 14B are flowcharts illustrating the operation of the STA 100 according to the present embodiment acquiring parameter information. Here, also in the case where the AP 200 acquires parameter information, the operation shown in FIGS. 14A and 14B may be performed as in the STA 100.

In step S1300, the wireless communication unit 110 detects a signal having an RSSI greater than a predetermined threshold. In the case where the reception processing unit 112 detects a preamble of a wireless LAN by computing correlation between a predetermined signal pattern and a reception signal (Yes in step S1304), in step S1308, the received frame analysis unit 121 extracts information of the PLCP Header. Then, in step S1312, the received frame analysis unit 121 acquires a parameter related to the MCS (MCS Index) included in the PLCP Header.

Then, in step S1316, the received frame analysis unit 121 analyzes a header configuration or version information included in a header. In the case where the header of the signal conforms to a standard supported by the own device (a standard in which Tx Power, BSS Color, and the like are included in a header) (Yes in step S1316), in step S1320, the received frame analysis unit 121 acquires a parameter related to transmission power (Tx Power) from the PLCP Header. In step S1324, the received frame analysis unit 121 acquires a parameter related to the BSS Color (BSS Color) from the PLCP Header.

In step S1328, in the case where the received frame analysis unit 121 determines that the acquired BSS Color information is BSS Color information of the own BSS (Yes in step S1328), the received frame analysis unit 121 causes the parameter information storage unit 125 to store the acquired parameter information as parameter information of the own BSS. In step S1328, in the case where the received frame analysis unit 121 determines that the acquired BSS Color information is not BSS Color information of the own BSS (No in step S1328), the received frame analysis unit 121 causes the parameter information storage unit 125 to store the acquired parameter information as parameter information of an OBSS.

In the case where the header of the signal does not conform to a standard supported by the own device in step S1316 (No in step S1316), in step S1332, the received frame analysis unit 121 acquires address information (Address 1 to Address 4) of the MAC Header. In the case where the address information of the MAC Header includes MAC address information of the AP 200 as a BSSID of the own BSS (Yes in step S1336), the received frame analysis unit 121 causes the parameter information storage unit 125 to store the acquired parameter information as parameter information of the own BSS.

In the case where the address information of the MAC Header does not include MAC address information of the AP 200 as a BSSID of the own BSS (No in step S1336), the received frame analysis unit 121 causes the parameter information storage unit 125 to store the acquired parameter information as parameter information of an OBSS. In the case where the reception processing unit 112 cannot detect a preamble of a wireless LAN in step S1304 (No in step S1304), in step S1348, the received frame analysis unit 121 causes the parameter information storage unit 125 to store the acquired parameter information as energy detection parameter information.

In step S1352, the received frame analysis unit 121 acquires information regarding an RSSI from the reception processing unit 112, and causes the parameter information storage unit 125 to store the information. In step S1356, the received frame analysis unit 121 acquires information regarding a transmission path utilization time from the reception processing unit 112, and causes the parameter information storage unit 125 to store the information.

In the case where an FCS error does not occur in a series of frames (Yes in step S1360), processing ends. In the case where an FCS error occurs in a series of frames in step S1360 (No in step S1360), the reception processing unit 112 provides error occurrence information to the operation control unit 131, the operation control unit 131 causes a storage unit (not illustrated) to store the information, and processing ends.

Figure 15A:
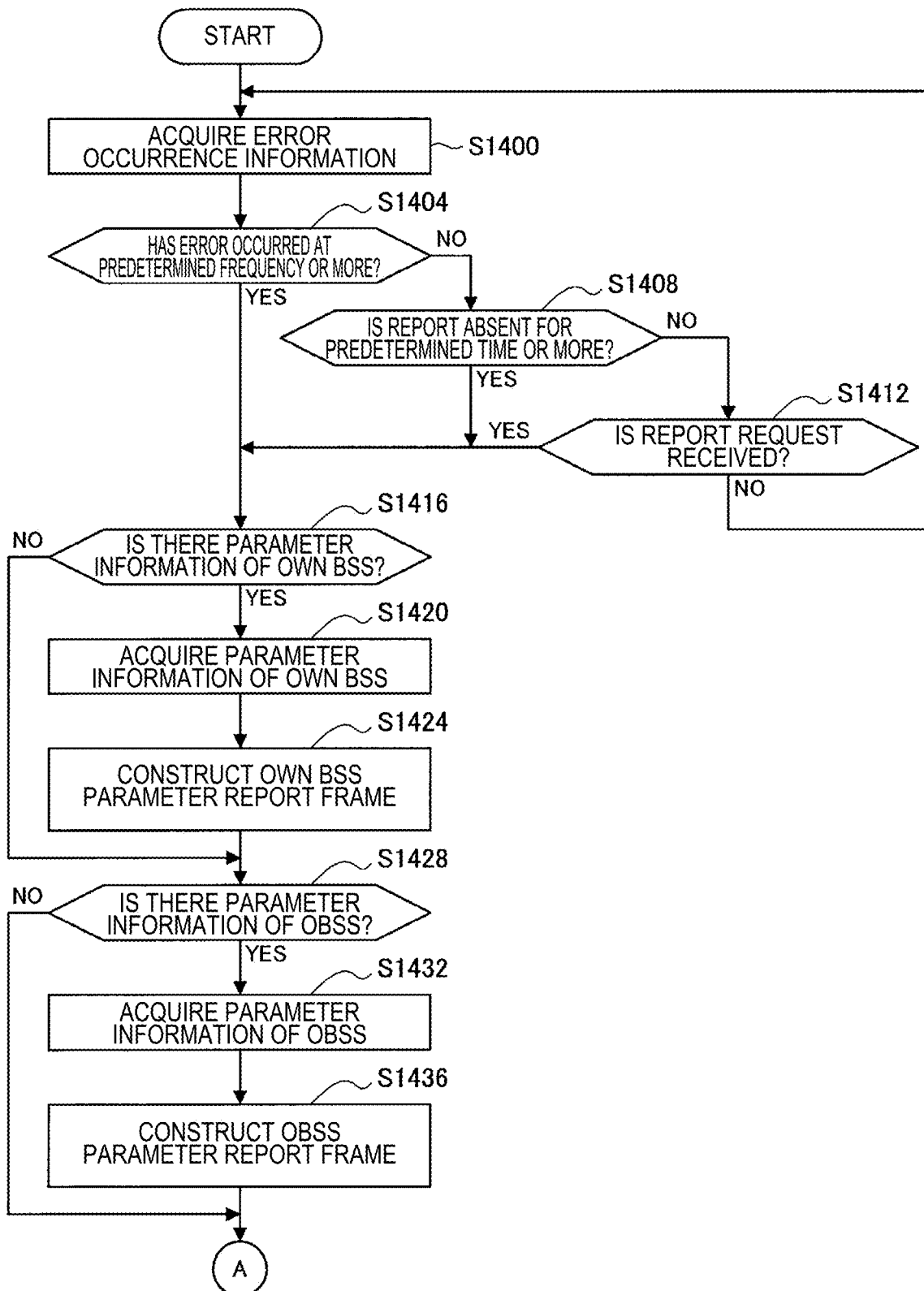
FIG. 15A is a flowchart illustrating the operation of an STA according to the present embodiment reporting parameter information to an AP.
Figure 15B:
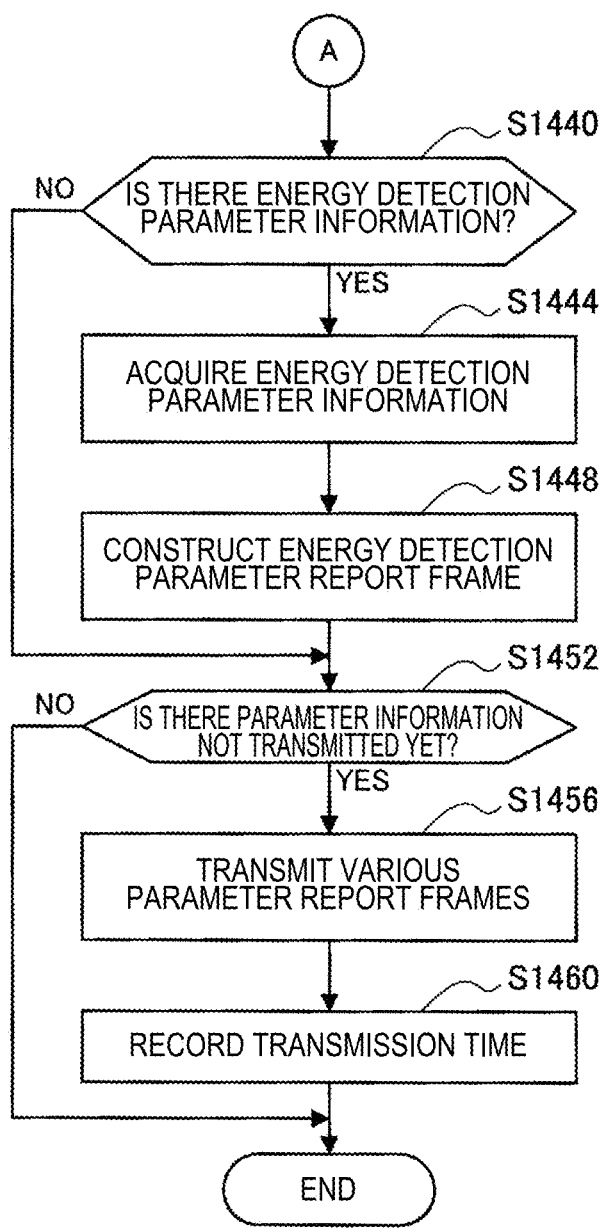
FIG. 15B is a flowchart illustrating the operation of an STA according to the present embodiment reporting parameter information to an AP.

The parameter information acquisition operation has been described above. Now, parameter information reporting operation will be described with reference to FIGS. 15A and 15B. FIGS. 15A and 15B are flowcharts illustrating the operation of the STA 100 according to the present embodiment reporting parameter information to the AP 200.

In step S1400, the operation control unit 131 acquires error occurrence information from the reception processing unit 112. Then, in the case where an error has occurred at a predetermined frequency or more in step S1404 (Yes in step S1404), parameter information reporting operation in step S1416 and subsequent steps is performed. In addition, even in the case where an error has not occurred at a predetermined frequency or more in step S1404 (No in step S1404), in the case where predetermined time or more passes from timing when parameter information has been reported previously (Yes in step S1408), processing of reporting parameter information is performed. Even in the case where predetermined time or more does not pass from timing when parameter information has been reported previously (No in step S1408), in the case where a parameter information report request from the AP 200 is received (Yes in step S1412), processing of reporting parameter information is performed. In the case where a parameter information report request from the AP 200 is not received in step S1412 (No in step S1412), processing moves to step S1400. As described above, these triggers for parameter information reporting operation may be changed as appropriate. In addition, processing of step S1400 may be omitted.

In step S1416, in the case where the parameter information storage unit 125 stores unreported parameter information of the own BSS (Yes in step S1416), in step S1420, the transmission frame constructing unit 126 acquires the unreported parameter information of the own BSS from the parameter information storage unit 125. In step S1424, the transmission frame constructing unit 126 constructs an own BSS parameter report frame. In the case where the parameter information storage unit 125 does not store unreported parameter information of the own BSS in step S1416 (No in step S1416), processing moves to step S1428.

In step S1428, in the case where the parameter information storage unit 125 stores unreported parameter information of an OBSS (Yes in step S1428), in step S1432, the transmission frame constructing unit 126 acquires the unreported parameter information of the OBSS from the parameter information storage unit 125. In step S1436, the transmission frame constructing unit 126 constructs a BSS parameter report frame. In the case where the parameter information storage unit 125 does not store unreported parameter information of an OBSS in step S1428 (No in step S1428), processing moves to step S1440.

In step S1440, in the case where the parameter information storage unit 125 stores unreported energy detection parameter information (Yes in step S1440), in step S1444, the transmission frame constructing unit 126 acquires the unreported energy detection parameter information from the parameter information storage unit 125. In step S1448, the transmission frame constructing unit 126 constructs an energy detection parameter report frame. In the case where the parameter information storage unit 125 does not store unreported energy detection parameter information in step S1440 (No in step S1440), processing moves to step S1452.

In step S1452, in the case where the parameter information storage unit 125 stores unreported parameter information (Yes in step S1452), in step S1456, the control unit 130 controls the wireless communication unit 110 to transmit a generated parameter report frame. In step S1460, the control unit 130 records a transmission time of the parameter report frame, and processing ends. In the case where the parameter information storage unit 125 does not store unreported parameter information in step S1452 (No in step S1452), processing ends.

4. Modifications

The parameter information reporting operation has been described above. Now, modifications of the present disclosure will be described with reference to FIGS. 16 to 18.

(4-1. First Modification)

Figure 16:
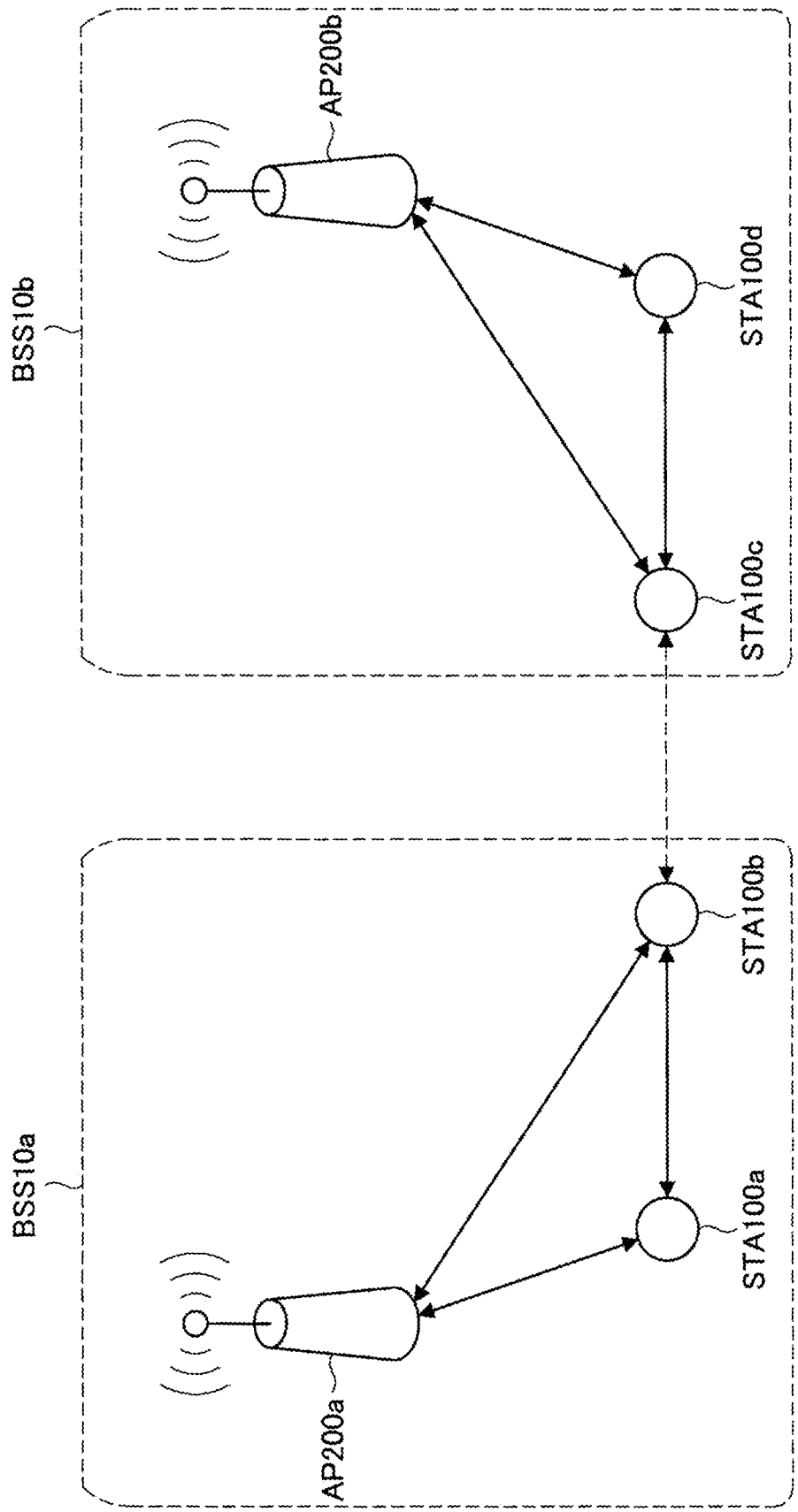
FIG. 16 illustrates a configuration of a wireless LAN system according to a first modification.
Figure 17:
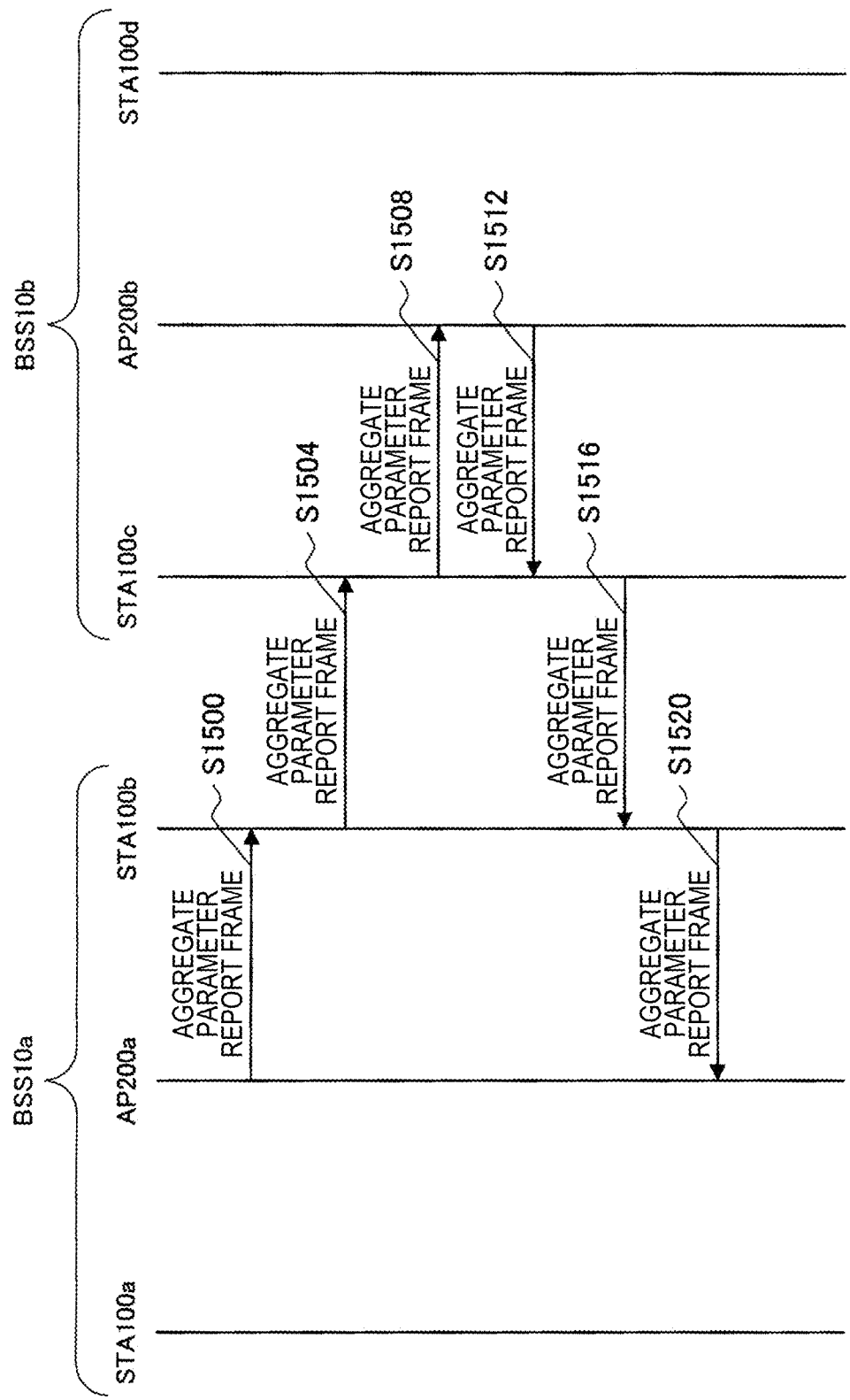
FIG. 17 is a sequence diagram illustrating the operation of APs exchanging aggregate parameter information in the first modification.

First, a first modification of the present disclosure is described with reference to FIGS. 16 and 17. FIG. 16 illustrates a configuration of a wireless LAN system according to the first modification.

The first modification is a case where it is difficult for the APs 200 to directly communicate with each other. As illustrated in FIG. 16, the STA 100*b* belonging to the BSS 10*a* can communicate with the STA 100*c* belonging to the BSS 10*b* that is an OBSS, but the AP 200*a* cannot communicate with the AP 200*b*. In the first modification, the AP 200 exchanges aggregate parameter information with another AP 200 via the STA 100.

That is, the STA 100 according to the first modification controls processing related to transfer of aggregate parameter information. More specifically, the received frame analysis unit 121 of the STA 100 analyzes a received frame, and in the case of determining that aggregate parameter information from the AP 200 is received, provides the information to the operation control unit 131. After that, the operation control unit 131 controls each component so as to transfer a frame including the aggregate parameter information.

Now, an example of aggregate parameter information exchange operation according to the first modification will be described with reference to FIG. 17. FIG. 17 is a sequence diagram illustrating the operation of the APs 200 exchanging aggregate parameter information in the first modification. In step S1500, the AP 200*a* transmits aggregate parameter information, and the STA 100*b* receives the aggregate parameter information. In step S1504, the STA 100*b* transfers aggregate parameter information, and the STA 100*c* receives the aggregate parameter information. In step S1508, the STA 100*c* transfers aggregate parameter information, and the AP 200*b* receives the aggregate parameter information.

In step S1512, the AP 200*b* transmits aggregate parameter information, and the STA 100*c* receives the aggregate parameter information. In step S1516, the STA 100*c* transfers aggregate parameter information, and the STA 100*b* receives the aggregate parameter information. In step S1520, the STA 100*b* transfers aggregate parameter information, and the AP 200*a* receives the aggregate parameter information.

As described above, according to the first modification, even in the case where the APs 200 cannot communicate with each other directly, the AP 200 can exchange aggregate parameter information with a different AP 200 via the STA 100. For example, even in a situation in which different APs 200 cannot always communicate with each other normally, such as the case where a place of the AP 200 may be changed, the AP 200 can exchange aggregate parameter information with a different AP 200.

(4-2. Second Modification)

Figure 18:
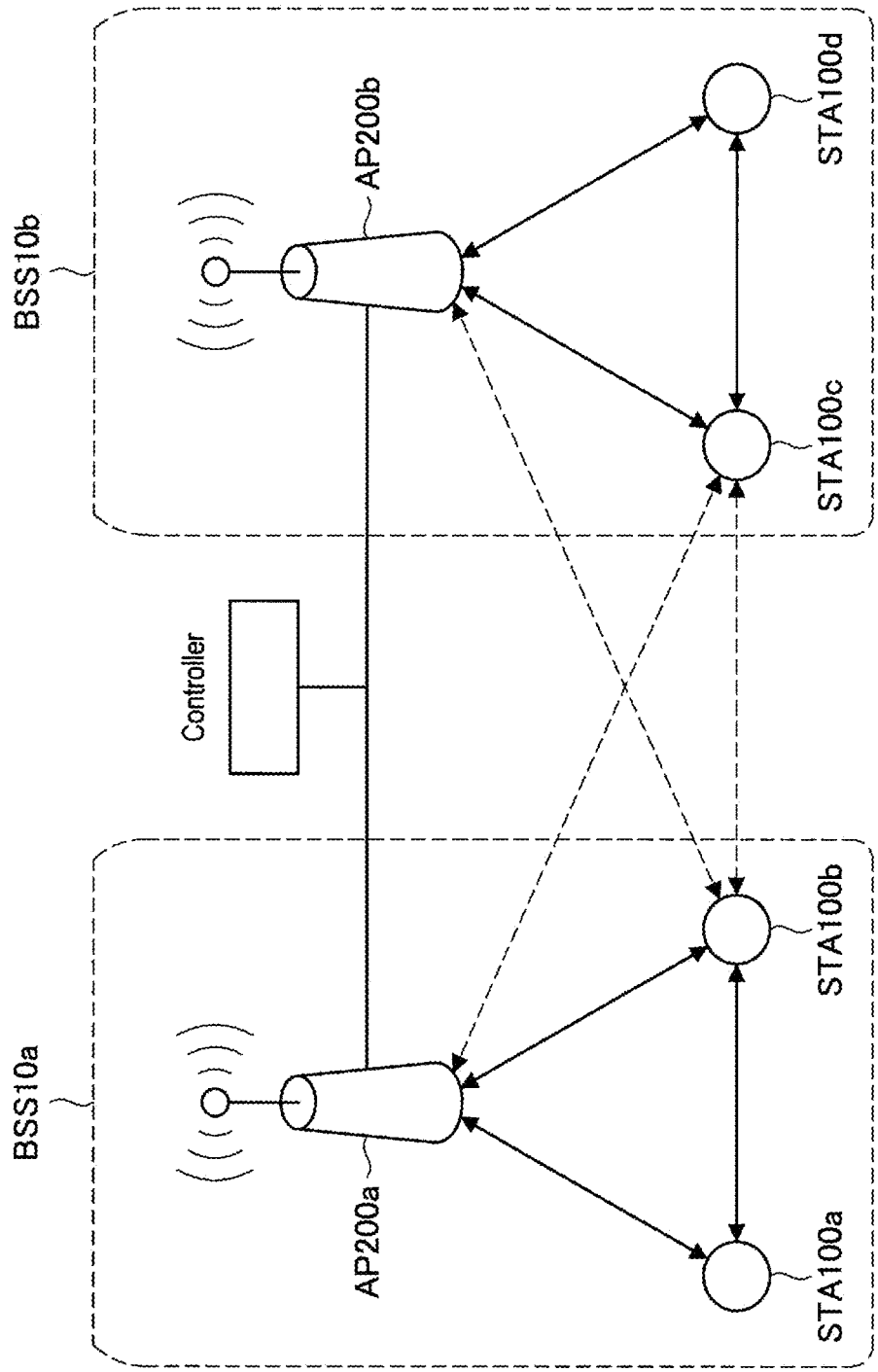
FIG. 18 illustrates a configuration of a wireless LAN system according to a second modification.

Now, a second modification of the present disclosure will be described with reference to FIG. 18. FIG. 18 illustrates a configuration of a wireless LAN system according to the second modification.

The second modification is a case where a controller and a plurality of APs 200 are connected via a wired network. As illustrated in FIG. 18, the AP 200*a*, the AP 200*b*, and a controller are connected via a wired network. For example, the AP 200*a*, the AP 200*b*, and the controller may be connected via an Ethernet cable. In the second modification, the AP 200 transmits aggregate parameter information to the controller or exchanges aggregate parameter information with another AP 200 via the wired network. In the second modification, interference control using interference information may be performed by the controller, or may be performed by each AP 200 as appropriate.

As shown in the second modification, the present disclosure may be applied to wireless LAN systems of various network configurations.

5. Application Examples

The technology according to the present disclosure can be applied to various products. For example, the STA 100 may be realized as mobile terminals such as smartphones, tablet personal computers (PCs), notebook PCs, portable game terminals, or digital cameras, fixed-type terminals such as television receivers, printers, digital scanners, or network storages, or car-mounted terminals such as car navigation devices. In addition, the STA 100 may be realized as terminals that perform machine to machine (M2M) communication (also referred to as machine type communication (MTC) terminals) such as smart meters, vending machines, remotely controlled monitoring devices, or point of sale (POS) terminals. Furthermore, the STA 100 may be wireless communication modules mounted in such terminals (for example, integrated circuit modules configured by one die).

On the other hand, for example, the AP 200 may be realized as a wireless LAN access point (also referred to as a wireless base station) which has a router function or does not have a router function. The AP 200 may be realized as a mobile wireless LAN router. The AP 200 may also be a wireless communication module (for example, an integrated circuit module configured with one die) mounted on such devices.

(5-1. First Application Example)

Figure 19:
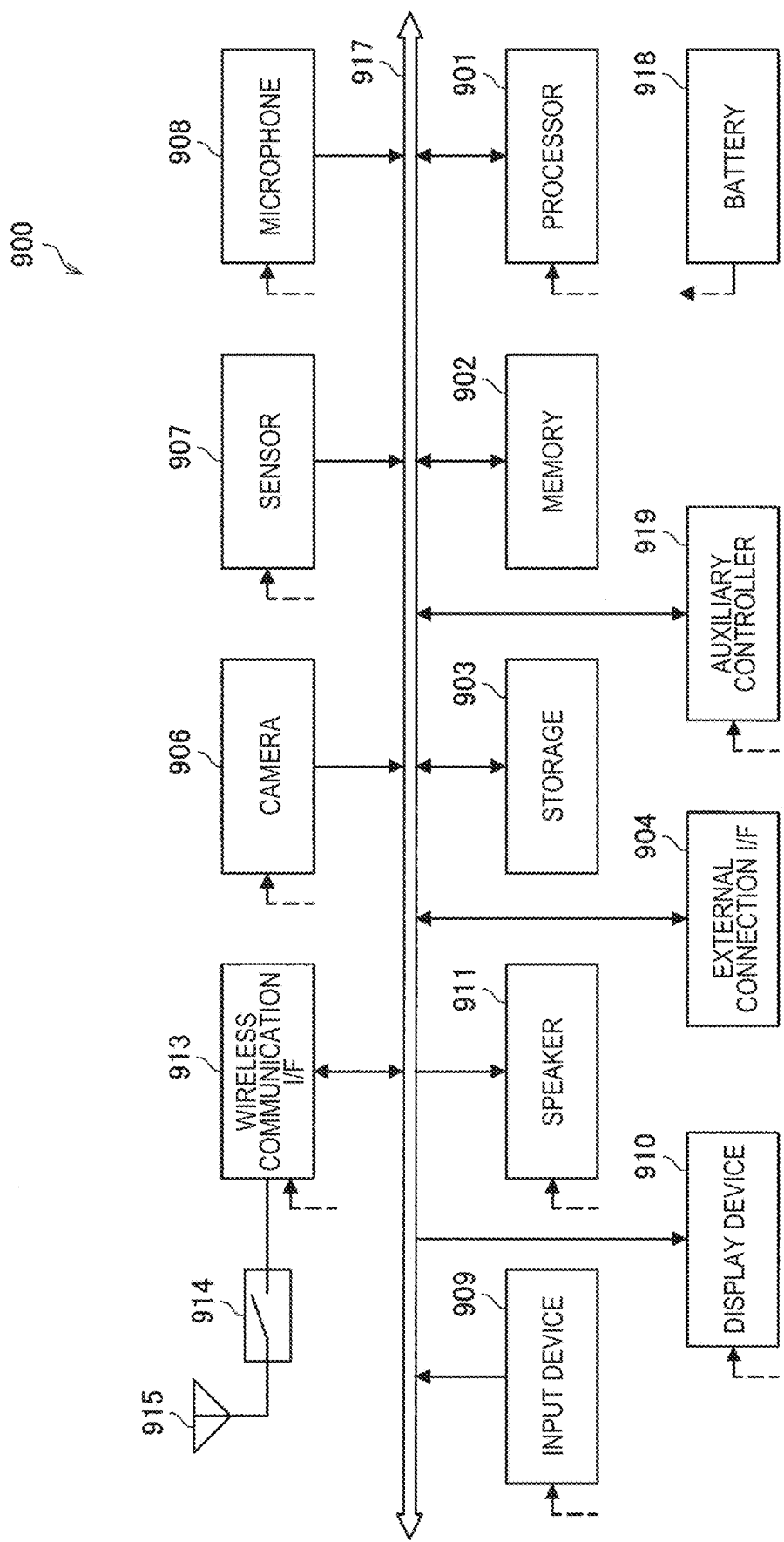
FIG. 19 is a block diagram illustrating an example of a schematic configuration of a smartphone.

FIG. 19 is a block diagram illustrating an example of a schematic configuration of a smartphone 900 to which the technology of the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes random access memory (RAM) and read only memory (ROM), and stores data and programs executed by the processor 901. The storage 903 can include a storage medium such as a semiconductor memory or a hard disk. The external connection interface 904 is an interface for connecting an externally attachable device such as a memory card or a universal serial bus (USB) device to the smartphone 900.

The camera 906 has an image sensor, for example, a charge coupled device (CCD) or a complementary metal oxide semiconductor (CMOS), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive operation or information input from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad, to establish wireless communication. The wireless communication interface 913 can communicate with another device via a wireless LAN access point in an infrastructure mode. In addition, the wireless communication interface 913 can directly communicate with another device in a direct communication mode such as an ad hoc mode or Wi-Fi Direct (registered trademark). Note that, Wi-Fi Direct is different from the ad hoc mode. One of two terminals operates as an access point, and communication is performed directly between the terminals. The wireless communication interface 913 can typically include a baseband processor, a radio frequency (RF) circuit, a power amplifier, and the like. The wireless communication interface 913 may be a one-chip module on which a memory that stores a communication control program, a processor that executes the program, and a relevant circuit are integrated. The wireless communication interface 913 may support another kind of wireless communication scheme such as a cellular communication scheme, a near-field communication scheme, or a proximity wireless communication scheme in addition to the wireless LAN scheme. The antenna switch 914 switches a connection destination of the antenna 915 among a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals through the wireless communication interface 913.

Note that the smartphone 900 may include a plurality of antennas (for example, antennas for a wireless LAN or antennas for a proximity wireless communication scheme, or the like), without being limited to the example of FIG. 19. In this case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 with each other. The battery 918 supplies electric power to each of the blocks of the smartphone 900 illustrated in FIG. 19 via power supply lines partially indicated by dashed lines in the drawing. The auxiliary controller 919 causes, for example, necessary minimum functions of the smartphone 900 to be operated in a sleep mode.

In the smartphone 900 illustrated in FIG. 19, the wireless communication unit 110, the data processing unit 120, and the control unit 130 described with reference to FIG. 9 may be mounted on the wireless communication interface 913. In addition, at least some of these functions may be mounted on the processor 901 or the auxiliary controller 919.

Note that the smartphone 900 may operate as a wireless access point (software AP) as the processor 901 executes the function of an access point at an application level. In addition, the wireless communication interface 913 may have the function of a wireless access point.

(5-2. Second Application Example)

Figure 20:
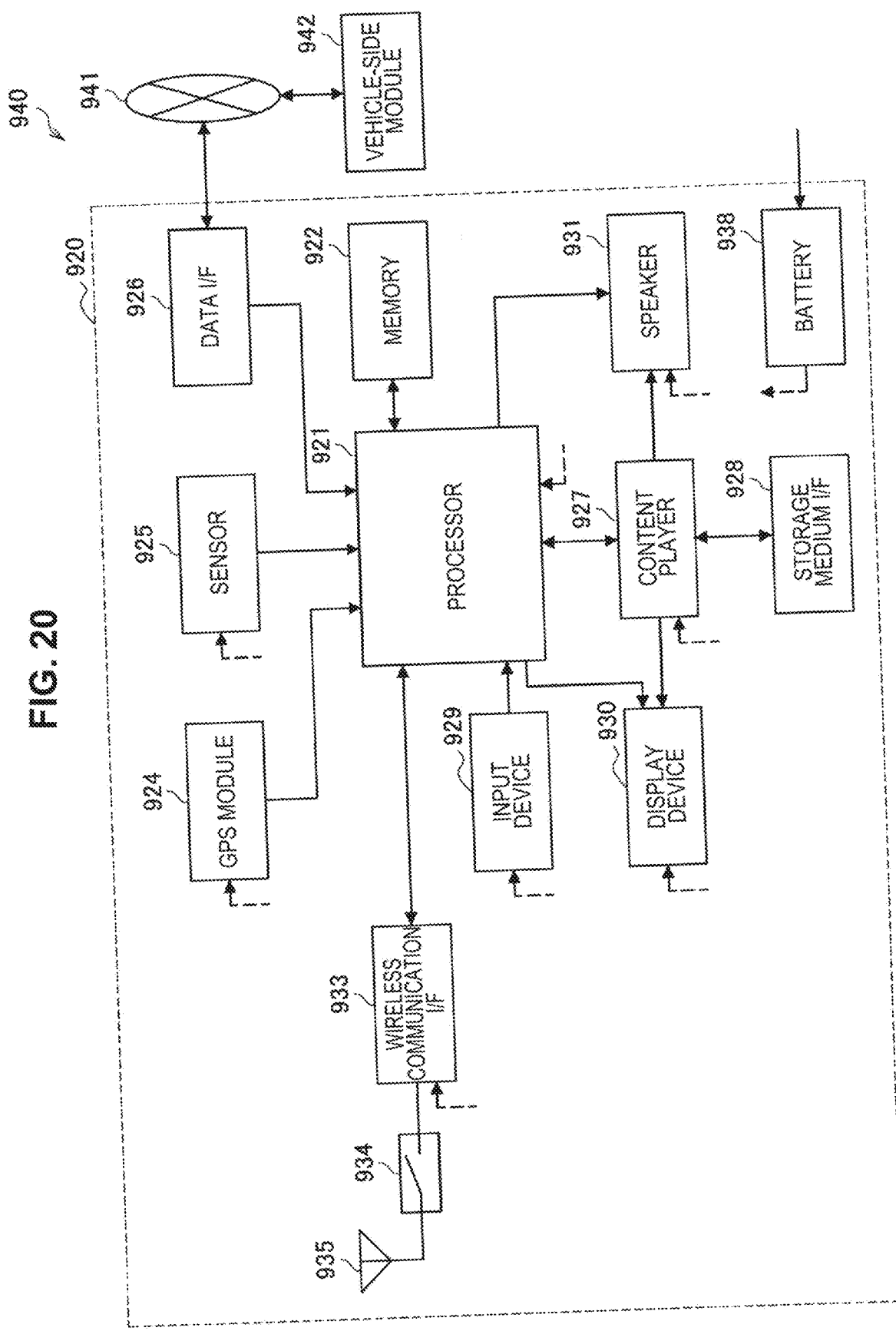
FIG. 20 is a block diagram illustrating an example of a schematic configuration of a car navigation device.

FIG. 20 is a block diagram illustrating an example of a schematic configuration of a car navigation device 920 to which the technology of the present disclosure can be applied. The car navigation device 920 includes a processor 921, a memory 922, a GPS module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes RAM and ROM storing data and programs executed by the processor 921.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a barometric sensor, and the like. The data interface 926 is connected with an in-vehicle network 941 via, for example, a terminal (not illustrated) to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive operation or information input from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, 11ad, and the like to execute wireless communication. The wireless communication interface 933 can communicate with another device via a wireless LAN access point in the infrastructure mode. In addition, the wireless communication interface 933 can directly communicate with another device in a direct communication mode such as an ad hoc mode or Wi-Fi Direct. The wireless communication interface 933 can typically have a baseband processor, an RF circuit, a power amplifier, and the like. The wireless communication interface 933 may be a one-chip module on which a memory that stores a communication control program, a processor that executes the program, and a relevant circuit are integrated. The wireless communication interface 933 may support another kind of wireless communication scheme such as a near-field communication scheme, a proximity wireless communication scheme, or the cellular communication scheme in addition to the wireless LAN scheme. The antenna switch 934 switches a connection destination of the antenna 935 among a plurality of circuits included in the wireless communication interface 933. The antenna 935 has a single or a plurality of antenna elements and is used for transmission and reception of wireless signals from and to the wireless communication interface 933.

Note that the car navigation device 920 may include a plurality of antennas, without being limited to the example of FIG. 20. In this case, the antenna switch 934 may be omitted from the configuration of the car navigation device 920.

The battery 938 supplies electric power to each of the blocks of the car navigation device 920 illustrated in FIG. 20 via power supply lines partially indicated by dashed lines in the drawing. In addition, the battery 938 accumulates electric power supplied from the vehicle side.

In the car navigation device 920 illustrated in FIG. 20, the wireless communication unit 110, the data processing unit 120, and the control unit 130 described with reference to FIG. 9 may be mounted on the wireless communication interface 933. In addition, at least some of these functions may be mounted on the processor 921.

In addition, the wireless communication interface 933 may operate as the AP 200 described above, and provide wireless communication for a terminal of a user on the vehicle.

Further, the technology of the present disclosure may be realized as an in-vehicle system (or a vehicle) 940 including one or more blocks of the above-described car navigation device 920, the in-vehicle network 941, and a vehicle-side module 942. The vehicle-side module 942 generates vehicle-side data such as a vehicle speed, the number of engine rotations, or failure information and outputs the generated data to the in-vehicle network 941.

(5-3. Third Application Example)

Figure 21:
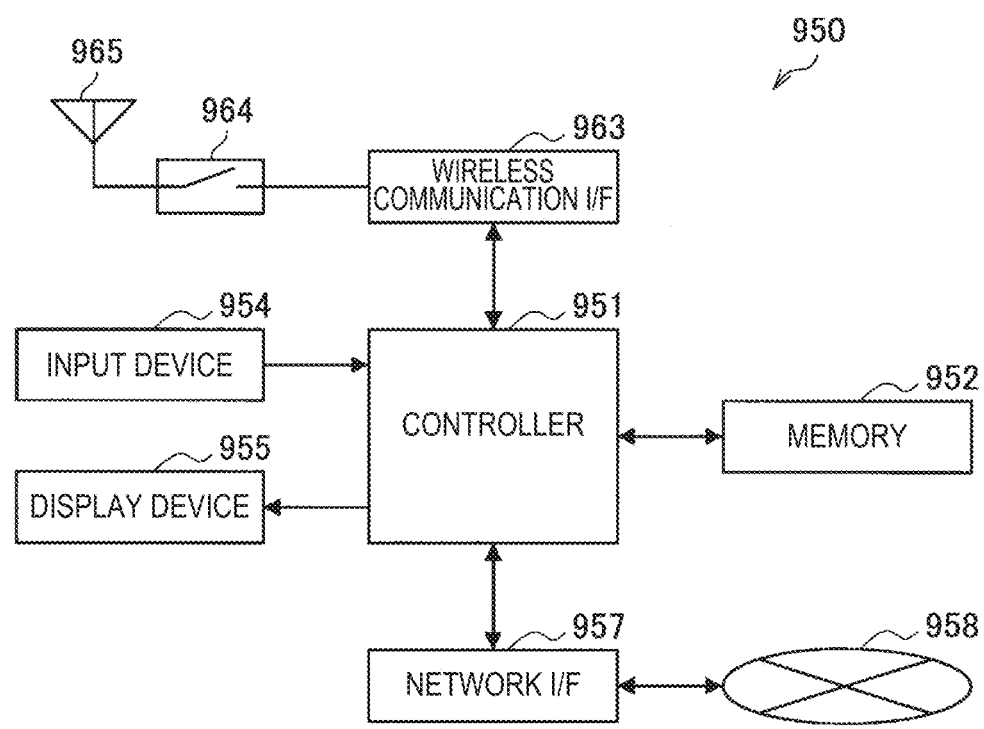
FIG. 21 is a block diagram illustrating an example of a schematic configuration of a wireless access point.

FIG. 21 is a block diagram illustrating an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access limitation, routing, encryption, a fire wall, and log management) of the Internet Protocol (IP) layer and higher layers of the wireless access point 950. The memory 952 includes RAM and ROM and stores a program executed by the controller 951 and various kinds of control data (for example, a terminal list, a routing table, an encryption key, security settings, and a log).

The input device 954 includes, for example, a button or a switch, and receives operation performed by a user. The display device 955 includes an LED lamp and displays an operation status of the wireless access point 950.

The network interface 957 is a wired communication interface that connects the wireless access point 950 with a wired communication network 958. The network interface 957 may include a plurality of connection terminals. The wired communication network 958 may be a LAN such as Ethernet (registered trademark) or may be a wide area network (WAN).

The wireless communication interface 963 supports one or more wireless LAN standards of IEEE 802.11, 11b, 11g, 11n, 11ac, 11ad, and the like to supply wireless connection to a nearby terminal as an access point. The wireless communication interface 963 can typically include a baseband processor, an RF circuit, and a power amplifier. The wireless communication interface 963 may be a one-chip module in which memory storing a communication control program, a processor executing the program, and relevant circuits are integrated. The antenna switch 964 switches a connection destination of the antenna 965 among a plurality of circuits included in the wireless communication interface 963. The antenna 965 includes one antenna element or a plurality of antenna elements and is used to transmit and receive a wireless signal through the wireless communication interface 963.

In the wireless access point 950 illustrated in FIG. 21, the wireless communication unit 210, the data processing unit 220, and the control unit 230 described with reference to FIG. 9 may be mounted on the wireless communication interface 963. In addition, at least some of these functions may be mounted on the controller 951.

6. Supplemental Remarks

The application examples of the present disclosure have been described above. Now, supplemental remarks about parameter information collection processing by the STA 100 will be described.

As described above, the STA 100 collects parameter information of a BSS or an OBSS, but does not need to always perform the collection processing. For example, the STA 100 may refrain from collecting parameter information in the case where error occurrence frequency in transmission/reception processing is equal to or less than a predetermined threshold, and collect parameter information in the case where error occurrence frequency is greater than the predetermined threshold. Thus, the STA 100 can reduce an amount of power consumed by trying to collect parameter information even in the case where interference has not occurred.

In addition, the STA 100 may refrain from collecting parameter information in the case where the own device is not connected to a power supply and is operated by a mobile battery, and collect parameter information in the case where the own device is connected to a power supply. Thus, the STA 100 can prevent the mobile battery from being exhausted by collecting parameter information.

In addition, in the case where the STA 100 is moving, an interference situation with an OBSS changes frequently; hence, there is a possibility that appropriate parameter information is not acquired. Consequently, the STA 100 may use a global positioning system (GPS) sensor or the like, refrain from collecting parameter information in the case of determining that the own device is moving by being carried by a user, and collect parameter information in the case of determining that the own device is not moving. Thus, the STA 100 can collect appropriate parameter information, and can reduce an amount of power consumed by acquiring inappropriate parameter information.

7. Conclusion

As described above, the AP 200 according to an embodiment of the present disclosure can grasp interference information without using a management device. Then, the AP 200 can exchange the interference information with another AP 200. Furthermore, the AP 200 can appropriately perform interference control on the basis of the interference information.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, steps in the operation of the STA 100 according to the present embodiment need not be always processed in chronological order in accordance with the order described as a flow chart. For example, steps in FIGS. 3 to 5, FIGS. 14A to 15B, and FIG. 18 may be processed in an order different from the order described in the drawing, or may be concurrently processed, as appropriate. For example, steps S1000 to S1012 in FIG. 3 may be processed in a different order, or may be concurrently processed.

In addition, part of the configuration of the STA 100 may be provided outside the STA 100 as appropriate. Similarly, part of the configuration of the AP 200 may be provided outside the AP 200 as appropriate.

In addition, some functions of the STA 100 may be implemented by the control unit 130. That is, the control unit 130 may implement some functions of the wireless communication unit 110 or the data processing unit 120. Similarly, some functions of the AP 200 may be implemented by the control unit 230. That is, the control unit 230 may implement some functions of the wireless communication unit 210 or the data processing unit 220.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
A station device including:
  a reception unit configured to receive a signal transmitted from another network other than a BSS to which the own device belongs;
  an acquisition unit configured to acquire parameter information regarding the signal; and
  a reporting unit configured to report the parameter information to an access point device that performs interference control in the BSS.

(2)
The station device according to (1), in which the other network is an OBSS that overlaps with the BSS.

(3)
The station device according to (2), in which the parameter information includes modulation scheme information, transmission power information, BSS identification information, RSSI information, version information, type information, or transmission path utilization time information.

(4)
The station device according to (1), in which the other network is a cellular network.

(5)
The station device according to (4), in which the parameter information includes RSSI information or transmission path utilization time information.

(6)
The station device according to any one of (1) to (5), in which in a case where the reception unit receives a signal transmitted from the BSS,
  the acquisition unit acquires second parameter information regarding the signal transmitted from the BSS, and
  the reporting unit reports the second parameter information to the access point device.

(7)
The station device according to (6), in which
  the reception unit receives aggregate parameter information generated by the access point device aggregating the parameter information or the second parameter information, and
  the reporting unit reports the aggregate parameter information to an access point device that belongs to another BSS other than the BSS and performs interference control.

(8)
The station device according to any one of (1) to (3), further including
  a determination unit configured to determine whether or not the signal is a signal transmitted from the BSS on the basis of BSS identification information included in the parameter information,
  in which the reporting unit reports the parameter information as interference information to the access point device on the basis of the determination.

(9)
The station device according to any one of (1) to (8), in which the acquisition unit acquires the parameter information in a case where the station device is connected to a power supply or a case where the station device is not moving.

(10)
A wireless control method executed by a computer, including:
  receiving a signal transmitted from another network other than a BSS to which an own device belongs;
  acquiring parameter information regarding the signal; and
  reporting the parameter information to an access point device that performs interference control in the BSS.

(11)
A program causing a computer to implement:
  receiving a signal transmitted from another network other than a BSS to which an own device belongs;
  acquiring parameter information regarding the signal; and
  reporting the parameter information to an access point device that performs interference control in the BSS.

(12)
An access point device including:
  a reception unit configured to receive, from a station device, parameter information regarding a signal transmitted from another network other than a BSS to which the own device belongs; and
  a control unit configured to perform interference control on the basis of the parameter information.

(13)
The access point device according to (12), in which the other network is an OBSS that overlaps with the BSS.

(14)
The access point device according to (13), in which the parameter information includes modulation scheme information, transmission power information, BSS identification information, RSSI information, version information, type information, or transmission path utilization time information.

(15)
The access point device according to (12), in which the other network is a cellular network.

(16)
The access point device according to (15), in which the parameter information includes RSSI information or transmission path utilization time information.

(17)
The access point device according to any one of (12) to (16), in which
  the reception unit receives, from the station device, second parameter information regarding a signal transmitted from the BSS, and
  the control unit performs interference control on the basis of the parameter information and the second parameter information.

(18)
The access point device according to (17), further including:
  a generation unit configured to generate aggregate parameter information obtained by aggregating the parameter information or the second parameter information; and
  a reporting unit configured to report the aggregate parameter information to an access point device that belongs to another BSS other than the BSS and performs interference control.

(19)
A communication control method executed by a computer, including:

receiving, from a station device, parameter information regarding a signal transmitted from another network other than a BSS to which an own device belongs; and performing interference control on the basis of the parameter information.

(20) A program causing a computer to implement:

receiving, from a station device, parameter information regarding a signal transmitted from another network other than a BSS to which an own device belongs; and performing interference control on the basis of the parameter information.

REFERENCE SIGNS LIST

10 BSS
20 information element used for transmitting parameter information of BSS
30 information element used for transmitting parameter information of OBSS
40 information element used for transmitting energy detection parameter information
100 STA
110 wireless communication unit
120 data processing unit
130 control unit
200 AP
210 wireless communication unit
220 data processing unit
230 control unit

The invention claimed is:

1. A station device comprising:
an antenna;
wireless communication circuitry connected to the antenna;
control circuitry; and
a battery configured to supply electric power to the wireless communication circuitry, and the control circuitry,
wherein the control circuitry is configured to:
control the wireless communication circuitry to receive a signal transmitted from a network other than a Basic Service Set (BSS) to which the station device belongs;
control to acquire parameter information regarding the signal; and
control the wireless communication circuitry to report the parameter information to an access point device,
wherein the other network comprises an Overlap Basic Service Set (OBSS) having a coverage that overlaps with a coverage of the BSS, and
wherein the parameter information includes each of:
detection time information,
modulation and coding scheme (MCS) information,
BSS Color information,
received signal strength indicator (RSSI) information,
wireless local area network (LAN) version information,
frame type information, and
duration information regarding transmission path utilization time.

2. The station device according to claim 1, wherein parameter information further includes QoS parameter information.

3. The station device according to claim 1, wherein parameter information further includes transmission power information.

4. The station device according to claim 1, wherein, in a case where the control circuitry controls the wireless communication circuitry to receive a signal transmitted from the BSS, the control circuitry is configured to:
control to acquire a second parameter information regarding the signal transmitted from the BSS; and
control the wireless communication circuitry to report the second parameter information to the access point device.

5. The station device according to claim 4, wherein the control circuitry is configured to:
control the wireless communication circuitry to receive aggregate parameter information generated by the access point device, the aggregate parameter information aggregating the parameter information and the second parameter information; and
control the wireless communication circuitry to report the aggregate parameter information to an access point device that belongs to a BSS other than the BSS and performs interference control with the BSS other than the BSS.

6. The station device according to claim 1, wherein the control circuitry is further configured to:
control to determine that the signal is a not a signal transmitted from the BSS on a basis of the BSS Color information included in the parameter information; and
control the wireless communication circuitry to report the parameter information as interference information to the access point device on a basis of the determination.

7. The station device according to claim 1, wherein the control circuitry is configured to control to acquire the parameter information in a case where the station device is connected to a power supply or in a case where the station device is not moving.

8. An access point device comprising:
an antenna;
wireless communication circuitry connected to the antenna;
control circuitry; and
a network interface which connects the access point device to a wired communication network,
wherein the control circuitry is configured to:
control the wireless communication circuitry to receive, from a station device, parameter information regarding a signal transmitted from a network other than a Basic Service Set (BSS) to which the station device belongs; and
control to perform interference control with the BSS on a basis of the parameter information,
wherein the other network comprises an Overlap Basic Service Set (OBSS) having a coverage that overlaps with a coverage of the BSS, and
wherein the parameter information includes each of:
detection time information,
modulation and coding scheme (MCS) information,
BSS Color information,
received signal strength indicator (RSSI) information,
wireless local area network (LAN) version information,
frame type information, and
duration information regarding transmission path utilization time.

9. The access point device according to claim 8, wherein the parameter information further includes QoS parameter information.

10. The access point device according to claim 8, wherein the control circuitry is further configured to:
control to generate aggregate parameter information obtained by aggregating the parameter information or the second parameter information; and control the wireless communication circuitry to report the aggregate parameter information to an access point device that belongs to a BSS other than the BSS and performs interference control with the BSS other than the BSS.

* * * * *